US011114900B2

United States Patent
Van Wageningen

(10) Patent No.: US 11,114,900 B2
(45) Date of Patent: Sep. 7, 2021

(54) WIRELESS POWER TRANSFER VIA AN INTERMEDIATE DEVICE

(71) Applicant: KONINKLIJKE PHILIPS N.V., Eindhoven (NL)

(72) Inventor: Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 269 days.

(21) Appl. No.: 16/072,199

(22) PCT Filed: Feb. 1, 2017

(86) PCT No.: PCT/EP2017/052146
§ 371 (c)(1),
(2) Date: Jul. 24, 2018

(87) PCT Pub. No.: WO2017/134101
PCT Pub. Date: Aug. 10, 2017

(65) Prior Publication Data
US 2019/0044383 A1  Feb. 7, 2019

(30) Foreign Application Priority Data
Feb. 2, 2016 (EP) .................................... 16153749

(51) Int. Cl.
*H02J 50/50* (2016.01)
*H02J 50/80* (2016.01)
(Continued)

(52) U.S. Cl.
CPC .............. *H02J 50/50* (2016.02); *H02J 5/005* (2013.01); *H02J 50/12* (2016.02); *H02J 50/80* (2016.02);
(Continued)

(58) Field of Classification Search
CPC .......... H02J 50/12; H02J 50/005; H02J 50/80; H02J 50/50; H02J 7/025; H02J 50/10; H05B 6/1209; Y02B 40/123
(Continued)

(56) References Cited

U.S. PATENT DOCUMENTS 6,320,169 B1 * 11/2001 Clothier ............... G06K 7/0008
219/620
9,054,542 B2   6/2015 Baarman
(Continued)

FOREIGN PATENT DOCUMENTS

EP       2555378 A1    2/2013
WO    2013103939 A1    7/2013
(Continued)

OTHER PUBLICATIONS

Wireless Power Consortium, Accessed Jul. 2018, https://www.wirelesspowerconsortium.com/index.html.

*Primary Examiner* — Richard Isla
*Assistant Examiner* — Manuel Hernandez

(57) ABSTRACT

An intermediate device for supporting a power transfer to an electromagnetic load (505) from a power transmitter (201) comprises a resonance circuit (507) including an inductor (801) and a capacitor (803) where the inductor (801) is arranged to couple to the power transmitter (201) through a first surface area (509) and to the electromagnetic load (505) through a second surface area (511). The resonance circuit (507) is arranged to 5 concentrate energy of the power transfer electromagnetic signal from the first surface area (509) towards the second surface area (511). The device further comprises a communicator (807) for exchanging messages with the power transmitter (201). The communicator (807) transmits a request message to the power transmitter (201) comprising a request for the power transmitter (201) to generate a measurement electromagnetic signal. A (Continued)

load indication 10 processor (813) determines a load indication indicative of a loading of the measurement electromagnetic signal and a detector (815) detects a presence of the electromagnetic load in response to the load indication.

11 Claims, 11 Drawing Sheets

(51) Int. Cl.
  *H05B 6/12* (2006.01)
  *H02J 50/12* (2016.01)
  *H02J 5/00* (2016.01)
  *H02J 50/10* (2016.01)

(52) U.S. Cl.
  CPC ............ *H05B 6/1209* (2013.01); *H02J 50/10* (2016.02); *Y02B 40/00* (2013.01)

(58) Field of Classification Search
  USPC .......................................... 320/108; 307/104
  See application file for complete search history.

(56) References Cited

U.S. PATENT DOCUMENTS

| | | | |
|---|---|---|---|
| 9,866,073 | B2 | 1/2018 | Joye et al. |
| 2009/0120928 | A1 | 5/2009 | Lee et al. |
| 2011/0304216 | A1 | 12/2011 | Baarman |
| 2012/0000903 | A1 | 1/2012 | Baarman et al. |
| 2012/0019075 | A1 | 1/2012 | Cho et al. |
| 2012/0068550 | A1 | 3/2012 | Boer et al. |
| 2014/0159502 | A1* | 6/2014 | Shimokawa ........ H02J 7/00034 307/104 |
| 2015/0163864 | A1* | 6/2015 | Baarman ................. H02J 50/12 99/358 |
| 2015/0229134 | A1* | 8/2015 | Masaoka ................. H02J 50/80 307/104 |
| 2015/0255990 | A1* | 9/2015 | Masaoka ................. H02J 50/80 307/104 |
| 2016/0006484 | A1* | 1/2016 | Swaans ................... H02J 7/025 307/104 |
| 2016/0294219 | A1 | 10/2016 | Van Wageningen et al. |

FOREIGN PATENT DOCUMENTS

| | | |
|---|---|---|
| WO | 2014108785 A1 | 7/2014 |
| WO | 2015032419 A1 | 3/2015 |
| WO | 2015062947 A1 | 5/2015 |

* cited by examiner

WIRELESS POWER TRANSFER VIA AN INTERMEDIATE DEVICE

CROSS-REFERENCE TO PRIOR APPLICATIONS

This application is the U.S. National Phase application under 35 U.S.C. § 371 of International Application No. PCT/EP2017/052146, filed on 1 Feb. 2017, which claims the benefit of European Patent Application No. 16153749.3, filed on 2 Feb. 2016. These applications are hereby incorporated by reference herein.

FIELD OF THE INVENTION

The invention relates to wireless power transfer and in particular, but not exclusively, to wireless power transfer for heating appliances.

BACKGROUND OF THE INVENTION

Most present day electrical systems and devices require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi Specifications further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi Specification supports communication from the power receiver to the power transmitter thereby enabling the power receiver to provide information that may allow the power transmitter to adapt to the specific power receiver. In the current Specification, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The Qi Specification is being developed to support increasingly high power demanding applications. For example, the Specification is intended to be used with devices consuming several kilowatts of power. In addition, new wireless power transfer specifications and standards are being developed to address such higher power applications.

For example, the wireless power transfer is expected to increasingly be used with e.g. kitchen appliances such as kettles, blenders, food processors etc. In particular, wireless power transfer is envisaged for providing power to various heating devices. For example, the concept is expected to be widely used e.g. in cooking stoves supporting kettles and pans that are heated by means of magnetic induction.

As an example, FIG. 1 illustrates an example of a wireless power provision to a heating appliance (such as a pan or a kettle).

In the example, the power providing apparatus comprises a power transmitter 101 which is shown as being sub-divided into a power source 103, a transmitter coil 105, and an inverter 107 receiving power from the power source 103 and generating a drive signal for the transmitter coil 105. The transmitter coil 105 is located close to, or integrated within, a kitchen worktop 109. A heating appliance 111, such as a kettle, is positioned on the worktop and comprises a heating element 113 in which the power transmitter 101 may induce eddy currents which result in the heating element heating up.

The bottom of the pan or kettle may get very hot. However, the worktop may be made from a material that is not resistant to such high temperatures. For example, typical kitchen worktops may be made from materials such as wood or granite. However, these materials may have a much lower heat resistance and may potentially even be damaged if subjected to the high temperatures of the kettle.

Indeed, generally, the increased flexibility and variation of applications of wireless power transfer at increasingly high power levels (where in particular the power transfer may support heated power consuming devices) has led to increased risks and complications. This may in particular be the case for kitchen scenarios using wireless power transfer but is not limited to such applications.

In order to support such temperature applications, it has in WO2015062947A1 been suggested that a thermal barrier capable of protecting the worktop surface may be introduced. It is furthermore suggested that that thermal barrier includes a power repeater for focusing the electrical field towards the appliance (to compensate for the additional distance Z) and that an over-temperature protection is included by this power repeater being arranged to reduce the magnetic field strength if the temperature rises above a threshold.

However, whereas such an approach may provide improved support for wireless powering of e.g. kitchen appliances, there are still a number of outstanding problems, issues and challenges For example, the acceptance of wirelessly powered devices for kitchen and power transmitters in the market could suffer from a so called chicken and egg problem since wirelessly powered new appliances will need the availability and installation of power transmitters, and the installation of power transmitters will only make sense if appliances are available. Therefore, it would be advantageous of the requirements for the appliances in order to support wireless power transfer could be reduced. Indeed, the possibility of using conventional appliances that are not specifically developed for wireless power would be highly attractive. For example, it would be highly desirable if a conventional pan (in addition to conventional heating by being positioned on a heating element) also could be powered by wireless power transfer from an electromagnetic signal. Although a thermal barrier as described in WO2015062947A1 may assist in many practical applications, it may not be optimal in all scenarios. For example, in some scenarios, it would be advantageous for the thermal power to provide more functionality. However, it is at the same time desirable for the thermal barrier to have low complexity in order to e.g. reduce price and increase reliability.

Hence, an improved wireless power transfer approach would be advantageous and in particular an approach allowing increased flexibility, improved support for different applications and usage scenarios, additional or enhanced functionality, facilitated user operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided device for supporting a power transfer to an electromagnetic load from a power transmitter comprising a power transfer coil providing a power transfer electromagnetic signal when in a power transfer mode; the device having a first surface area and a second surface area and comprising: a resonance circuit including an inductor and a capacitor, the inductor being arranged to couple to the power transmitter through the first surface area and to couple to the electromagnetic load through the second surface area; the resonance circuit being arranged to concentrate energy of the power transfer electromagnetic signal from the first surface area towards the second surface area; a communicator for exchanging messages with the power transmitter, the communicator being arranged to transmit a request message to the power transmitter comprising a request for the power transmitter to generate a measurement electromagnetic signal; a load indication processor for determining a load indication indicative of a loading of the measurement electromagnetic signal; and a detector for detecting a presence of the electromagnetic load in response to the load indication.

The invention may provide an effective and in many embodiments very practical approach for an intermediate device to detect whether an electromagnetic load is present for power transfer from a power transmitter. The approach may allow the device to adapt its operation in dependence on whether the electromagnetic load is present or not. The intermediate device may comprise a controller for adapting an operation of the wireless power transfer system, and in particular of the intermediate device, in response to the detection of the presence of the electromagnetic load. In many embodiments, the intermediate device may be arranged to adapt a power transfer operation in response to the detection of the presence of the electromagnetic load. Specifically, the intermediate device may be arranged to initiate a power transfer in response to the detection of the presence of the electromagnetic load.

Specifically, the approach may in many systems allow the device to initialize and/or control a power transfer from the power transmitter to the electromagnetic load, and indeed may in some embodiments enable power transfer to an electromagnetic load which has no functionality for interacting with the power transmitter. In some embodiments, the device may even allow power transfer to a traditional heating plate, such as e.g. to a traditional pan.

The invention may facilitate, enable, and/or support such operation while allowing a low-complexity device. In particular, the approach may in many embodiments allow a device to not require any additional power than that which is provided by the power transmitter. For example, the device may be implemented as trivet or coaster that does not require plugging in or includes any battery. The approach may in many embodiments allow a reliable detection as the measurement electromagnetic signal is generated by the power transmitter, and thus can typically can be generated with a high signal strength.

The invention may allow improved flexibility and support for an increased variety of different usage scenarios for wireless power transfer. For example, it may provide improved support for e.g. kitchen usage scenarios.

The device may specifically be a thermal barrier and may provide protection for the power transmitter against high temperatures of the electromagnetic load. The device may allow e.g. electromagnetic loads heated by wireless power transfer to be used with wireless power transmitters associated with insufficient thermal protection while at the same time ensuring efficient power transfer.

The resonance circuit may operate as a power repeater arranged to concentrate energy/power of the power transfer electromagnetic signal from the first surface area towards the second surface area by being arranged to increase the magnetic flux density for the second surface area (compared to if the magnetic flux density if the power repeater, i.e. the resonance circuit, were not present. The resonance circuit may allow the device to be e.g. inserted between the power transmitter and the electromagnetic load while still allowing a strong magnetic field to be provided to the electromagnetic load. For example, using a conventional thermal barrier will in most scenarios result in a substantially degraded power transfer performance due to the increased distance and reduced coupling between the transmit coil of the power transmitter and the electromagnetic load. The device however may e.g. provide efficient thermal protection by allowing an increased distance between the transmit coil and the electromagnetic load while still ensuring an efficient effective coupling between the transmit coil and the electromagnetic load. In particular, the resonance circuit may concentrate the magnetic field such that an increased flux passes through the electromagnetic load, i.e. the flux density may be increased. The resonance circuit may concentrate the energy towards the second surface area by guiding, biasing or moving magnetic field lines from the second electromagnetic signal towards the second surface area. The resonance circuit may effectively function as a magnetic lens. Specifically, it may deform the magnetic field from the power transmitter to provide an increased flux through the second surface area/the electromagnetic load. It may thus increase the magnetic flux density for the second surface area.

The first surface area and the second surface area may be on opposing (and possibly substantially parallel) surfaces of the device.

The first surface area may specifically be arranged to couple to the power transmitter by being arranged to receive the power transmitter. The first surface area may be arranged to touch, attach, connect to, or rest on a surface of the power transmitter, or may provide a surface area for the power transmitter to be positioned on or to be positioned on the power transmitter.

The second surface area may specifically be arranged to couple to the electromagnetic load by being arranged to receive the electromagnetic load. The second surface area may be arranged to touch, attach, connect to, or rest on a surface of the electromagnetic load, or may provide a surface area for the electromagnetic load to be positioned on or for the power transmitter to be positioned on.

The electromagnetic load may be an entity extracting power from the power transfer electromagnetic signal. The electromagnetic load may specifically be a power receiver, potentially (at least partly) without functionality for interacting with the power transmitter. The electromagnetic load provides a loading of the power transfer electromagnetic signal. In this way, power may transferred directly from the power transmitter to the electromagnetic load by the power transfer electromagnetic signal without any intermediate conversion to electrical energy. The electromagnetic load loads the magnetic field generated by the power transfer signal. Thus, the power transfer magnetic field/signal causes current to be induced in the electromagnetic load resulting in power being extracted from the field by the electromagnetic load.

The electromagnetic load may in some embodiments comprise or consist in a conductive element, and specifically a conductive heating element. Specifically, the power may be received by the power transfer electromagnetic signal causing Eddy currents in a conductive element of the electromagnetic load. The electromagnetic load may in many embodiments be a heating plate, e.g. of a pan, kettle, pot or similar kitchen heating appliance.

The device may be arranged to adapt an operation in response to the detection of the presence of the electromagnetic load. In particular, the device may comprises an initiator arranged to initialize a power transfer operation in response to the detection of the presence of the electromagnetic load. The initialization may e.g. include transmitting one or more messages to the power transmitter to initialize a power transfer operation from the power transmitter. The device may be arranged to transmit one or more messages to the power transmitter in response to the detection of the presence of the electromagnetic load. The message exchange with the power transmitter may be dependent on the detection of the presence of the electromagnetic load.

The loading of the measurement electromagnetic signal may be an extracted power. The load indication may be indicative of a power being extracted from the measurement electromagnetic signal. The load indication may be determined as a direct measurement of the loading or may indirectly be determined as a measure which is dependent on the loading of the electromagnetic signal. For example, the load indication may reflect the impedance of the resonance circuit of the device or of a resonance circuit of the power transmitter.

The inductor is arranged to couple to the power transmitter through the first surface area and to the electromagnetic load through the second surface area when the device is in use and the electromagnetic load is present.

In accordance with an optional feature of the invention, the device further comprises a power transfer controller arranged to control the power transfer operation of the power transmitter by exchanging power transfer control messages with the power transmitter, a property of the exchange of power transfer control messages being dependent on the detection of the presence of the electromagnetic load.

The device may specifically control power control functionality which can control the power transfer to the electromagnetic load. This may in many embodiments allow conventional devices, such as conventional kitchen heating appliances, to be used with a wireless power transmitter despite the device not having any, or having insufficient, control functionality for such a transfer. In effect, an electromagnetic load without control functionality can be used by the required control functionality being included in the intermediate device. For example, a conventional pan could be used with a trivet comprising all the control functionality required by a power receiver in order to interwork with the power transmitter to provide a power transfer.

However, whereas the majority of the control functionality and message exchange for such a scenario may follow the specifications and principles of a typical power receiver in accordance with the corresponding specifications (e.g. the Qi specifications), the arrangement has additional complexity by the device needing to operate both in a mode where there is no electromagnetic load present and in a mode where there is an electromagnetic load present. Accordingly, the current approach may allow a reliable detection of whether the electromagnetic load is present (while allowing low complexity and without necessarily requiring any other power provision), thereby allowing the device to adapt the power control operation in response to this. In particular, it will allow the device to switch between different modes of operation. Specifically, the device may switch between an active power transfer mode and a non-power transfer mode in response to whether the presence of the electromagnetic load is detected or not. The message exchange (or absence of message exchange) associated with respectively a non-active mode and an active power transfer mode may then be adapted accordingly.

The power transfer controller may be arranged to modify or adapt the message exchange in response to whether the presence of the electromagnetic load is detected or not.

In some embodiments, the electromagnetic load may be part of a removable device which comprises no functionality for communicating with the power transmitter. In some embodiments, the electromagnetic load may have no capability of controlling a power transfer from a wireless power transmitter. Thus, in some embodiments the power transfer from the power transmitter to the electromagnetic load may be fully controlled by the device (and the power transmitter).

In accordance with an optional feature of the invention, the device further comprises a power transfer controller arranged to control a power level of the power transfer electromagnetic signal by transmitting power control messages to the power transmitter.

The device may in many embodiments be able to control the power level of the power provided to the electromagnetic load. Specifically, the power transfer controller may be arranged to control the power level of the power transfer electromagnetic signal by transmitting power control messages to the power transmitter during a power transfer phase.

In accordance with an optional feature of the invention, the device further comprises a temperature sensor for determining a temperature indication for the second surface, and wherein the power transfer controller is arranged to generate the power control messages in response to the temperature indication.

The device may enable or facilitate wireless power transfer to e.g. a heating element while allowing this power transfer to be controlled to provide a desired heating effect. For example, the approach may allow a conventional pan to be heated to a desired temperature by power provided from a wireless power transmitter.

For example, a heating plate may be powered by the power transfer signal and the temperature may be controlled by a power control loop from the power receiver to the power transmitter.

The temperature indicator may be a value indicative of a measured temperature such that increasing values indicate increasing temperatures. The temperature sensor may be positioned such that the temperature indication is indicative of a temperature of an element of the electromagnetic load, and specifically may be indicative of a temperature of a heating element heated by the power transfer electromagnetic signal. The temperature sensor may for example be positioned close to the second surface which may be a surface with which the element of electromagnetic load is in contact when in use.

In accordance with an optional feature of the invention, the device further comprises a power transfer controller arranged to initialize a power transfer phase in response to the detection of the presence of an electromagnetic signal by exchanging power transfer control messages with the power transmitter.

This may provide an efficient operation yet allow a low complexity of the device. The approach may in particular in many scenarios allow the device to not require any power to be provided from any other means than the power transmitter, i.e. it may remove the need for the device to be electrically powered or to comprise a battery. The device may be arranged to extract power from the electromagnetic signal to power at least the power transfer controller.

The power transfer controller may initialize the power transfer operation by transmitting one or more power transfer initialization messages to the power transmitter such as e.g. a power transfer request message or a response message to a query from the power transmitter, e.g. providing power transfer parameter information to the power transmitter.

The electromagnetic signal may specifically be the power transfer electromagnetic signal or a communication electromagnetic signal provided for communication by the power transmitter (e.g. a communication carrier for load modulation by the device).

In accordance with an optional feature of the invention, the device further comprises a power transfer controller arranged to terminate a power transfer operation in response to the detector determining that the load indication is not indicative of the electromagnetic load being present by at least one of transmitting a power transfer termination message to the power transmitter and suppressing power transfer control messages for the power transmitter.

This may provide an effective operation and may in particular reduce the risk of strong magnetic fields being generated at times when no electromagnetic load is present, and it may thus reduce the risk of e.g. unintentional heating of foreign objects.

In some embodiments, the device further comprises a measurement unit for generating a load indication in response to a measurement of a property of the measurement electromagnetic signal; and the detector is arranged to determine whether the electromagnetic load is present or not in response to a comparison of the load indication to a reference value.

This may provide efficient operation in many embodiments and may specifically reduce the requirement for changes to the power transmitter thereby providing enhanced backwards compatibility. In many embodiments, the approach may allow for faster determination of the load indication, and thus a faster detection of the presence of the electromagnetic load.

In some embodiments, the device may substantially autonomously and independently detect whether the electromagnetic load is present based on a measurement of a property reflecting the loading of the measurement electromagnetic signal.

The reference value may be a value determined from a previous provision of a measurement electromagnetic signal. The measurement electromagnetic signal may be generated by the power transmitter to have substantially the same properties as the previous measurement electromagnetic signal. In some embodiments, the reference value may be a predetermined value. For example, the power transmitter may be arranged to always generate the measurement electromagnetic signal to have the same predetermined properties.

In some embodiments, the load processor may be arranged to generate the load indication in response to an operating property of the power repeater.

In accordance with an optional feature of the invention, the device further comprises a power extractor arranged to extract power from an electromagnetic signal generated by the power transmitter to at least partially power up the device; and the communicator is arranged to transmit the request message to the power transmitter as part of being powered up.

This may provide an efficient operation yet allow a low complexity of the device. The approach may in particular in many scenarios allow the device to not require any power to be provided from any other means that the power transmitter, i.e. it may remove the need for the device to be electrically powered or to comprise a battery In some embodiments, the device further comprises a user interface for receiving user inputs, and a calibrator arranged to initialize a calibration of at least one of a criterion for detecting the presence of the electromagnetic load and the determination of the load indication in response to receiving a user input indicating whether the electromagnetic load is present.

This may provide facilitated and/or improved operation in many embodiments. In particular, it may in many applications provide a more reliable and/or accurate detection.

In accordance with an optional feature of the invention, the communicator is arranged to receive a load message from the power transmitter comprising load data indicative of the loading of the measurement electromagnetic signal as determined by the power transmitter; and the load indication processor is arranged to determine the load indication in response to the load data.

This may facilitate operation and/or implementation in many embodiments. In particular, it may in many embodiments reduce the complexity of the device.

In accordance with an optional feature of the invention, the detector is arranged to detect if the electromagnetic load is present in response to a comparison of the load indication and a previous load indication.

This may provide facilitated and/or improved operation in many embodiments. In particular, it may in many applications provide a more reliable and/or accurate detection.

According to an aspect of the invention there is provided a power transmitter for providing wireless power to an electromagnetic load via an intermediate device; the power transmitter comprising: a resonance circuit comprising a capacitive impedance and an inductive impedance, the inductive impedance comprising a transmitter coil for generating a power transfer electromagnetic signal for wirelessly transferring power to the electromagnetic load; a driver for generating a drive signal for the resonance circuit; a message communicator for communicating messages with the intermediate device; a message processor for detecting a request message being received from the intermediate device comprising a request for the power transmitter to generate a measurement electromagnetic signal; and an electromagnetic signal generator for generating the measurement electromagnetic signal in response to the detection of the request message.

The power transmitter may allow improved and/or facilitated power transfer operation or implementation as previously described.

In some embodiments, the electromagnetic signal generator is arranged to generate the measurement electromagnetic signal by driving the resonance circuit to generate a power transfer electromagnetic signal.

This may provide improved performance and/or facilitated implementation in many embodiments. For example, it may reduce the circuitry required to implement the provision of the measurement electromagnetic signal. It may in many embodiments allow increased reuse of circuitry (e.g. the transmitter coil) for multiple purposes.

In accordance with an optional feature of the invention, the power transmitter further comprises a measurement coil and the electromagnetic signal generator is arranged to generate the measurement electromagnetic signal using the measurement coil and in a frequency band different from a frequency band for the power transfer electromagnetic signal.

This may provide improved performance and/or facilitated implementation in many embodiments. In some embodiments, it may allow for a more accurate detection.

In some embodiments, the power transmitter may comprise a communication coil for communicating with the intermediate device using a first frequency band different from a frequency band for the power transfer electromagnetic signal; and the electromagnetic signal generator may be arranged to generate the measurement electromagnetic signal in the first frequency band using the communication coil.

In accordance with an optional feature of the invention, the electromagnetic signal generator is arranged to generate the measurement electromagnetic signal to have properties corresponding to a previously generated measurement electromagnetic signal.

This may facilitate and/or improve detection in many embodiments.

In some embodiments a wireless power transfer system may comprise a device and a power transmitter as previously described.

According to an aspect of the invention there is provided a method for a device supporting a power transfer to an electromagnetic load from a power transmitter comprising a power transfer coil providing a power transfer electromagnetic signal when in a power transfer mode; the device having a first surface area and a second surface area and comprising a resonance circuit including an inductor and a capacitor, the inductor coupling to the power transmitter through the first surface area and coupling to the electromagnetic load through the second surface area; the resonance circuit being arranged to concentrate energy of the power transfer electromagnetic signal from the first surface area towards the second surface area; the method comprising: exchanging messages with the power transmitter including transmitting a request message to the power transmitter comprising a request for the power transmitter to generate a measurement electromagnetic signal; determining a load indication indicative of a loading of the measurement electromagnetic signal; and detecting a presence of the electromagnetic load in response to the load indication.

According to an aspect of the invention there is provided a method of operation for a power transmitter providing wireless power to an electromagnetic load via an intermediate device; the power transmitter comprising a resonance circuit comprising a capacitive impedance and an inductive impedance, the inductive impedance comprising a transmitter coil for generating a power transfer electromagnetic signal for wirelessly transferring power to the electromagnetic load; the method comprising: generating a drive signal for the resonance circuit; communicating messages with the intermediate device; detecting a request message being received from the intermediate device comprising a request for the power transmitter to generate a measurement electromagnetic signal; and generating the measurement electromagnetic signal in response to the detection of the request message.

In accordance with some embodiments of the invention there may be provided a wireless power transfer system for supporting a power transfer from a power transmitter to an electromagnetic load via an intermediate device; the power transmitter comprising: a resonance circuit comprising a capacitive impedance and an inductive impedance, the inductive impedance comprising a transmitter coil for generating a power transfer electromagnetic signal for wirelessly transferring power to the electromagnetic load, a driver for generating a drive signal for the resonance circuit, a message communicator for communicating messages with the intermediate device, a message processor for detecting a request message being received from the intermediate device comprising a request for the power transmitter to generate a measurement electromagnetic signal, and an electromagnetic signal generator for generating the measurement electromagnetic signal in response to the detection of the request message; and the intermediate device having a first surface area and a second surface area and comprising: a resonance circuit including an inductor and a capacitor, the inductor being arranged to couple to the power transmitter through the first surface area and to couple to the electromagnetic load through the second surface area; the resonance circuit being arranged to concentrate energy of the power transfer electromagnetic signal from the first surface area towards the second surface area, a communicator for exchanging messages with the power transmitter, the communicator being arranged to transmit the request message to the power transmitter comprising the request for the power transmitter to generate the measurement electromagnetic signal, a load indication processor for determining a load indication indicative of a loading of the measurement electromagnetic signal, and a detector for detecting a presence of the electromagnetic load in response to the load indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a kitchen application, and in particular to a wireless power transfer to a heating element of a kitchen appliance, such as a pan. However, it will be appreciated that the invention is not limited to this application but may be applied to many other applications and wireless power transfer systems. The description will also focus on embodiments compatible with many aspects of Qi wireless power transfer systems but it will be appreciated that this is merely for an example and that the described principles and approaches are not limited to such an application.

Figure 2:
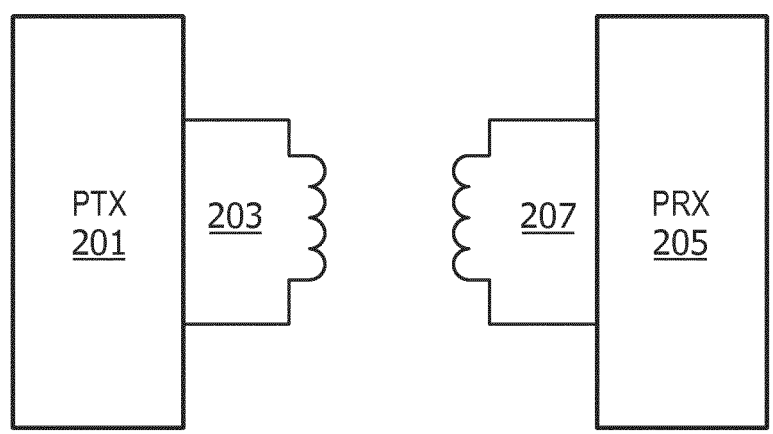
FIG. 2 is an illustration of a wireless power transfer system.

FIG. 2 illustrates an example of a power transfer system. The power transfer system comprises a power transmitter 201 which includes (or is coupled to) a transmitter coil/inductor 203. The system further comprises a power receiver 205 which includes (or is coupled to) a receiver coil/inductor 207.

The system provides a wireless inductive power transfer from the power transmitter 201 to the power receiver 205. Specifically, the power transmitter 201 generates a power transfer electromagnetic signal (which for brevity will also be referred to as a power signal or a power transfer signal) which is propagated as a magnetic flux by the transmitter coil 203. The power signal may typically have a frequency between around 20 kHz to 200 kHz. The transmitter coil 203 and the receiver coil 207 are loosely coupled and thus the receiver coil 207 picks up (at least part of) the power signal from the power transmitter 201. Thus, the power is transferred from the power transmitter 201 to the power receiver 205 via a wireless inductive coupling from the transmitter coil 203 to the receiver coil 207. The term power signal/power transfer signal or power transfer electromagnetic signal may be used to refer to the magnetic or inductive signal between the transmitter coil 203 and the power receiving entity (the magnetic flux signal), but it will be appreciated that by equivalence it may also be considered and used as a reference to the electrical signal provided to the transmitter coil 203.

In the following, the operation of the power transmitter 201 and the power receiver 205 will be described with specific reference to the Qi Specification. In particular, the power transmitter 201 and the power receiver 205 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 201 is in the selection phase wherein it merely monitors for the potential presence of a power receiver. The power transmitter 201 may use a variety of methods for this purpose, e.g. as described in the Qi wireless power specification. If such a potential presence is detected, the power transmitter 201 enters the ping phase wherein a power signal is temporarily generated. The power receiver 205 can apply the received signal to power up its electronics. After receiving the power signal, the power receiver 205 communicates an initial packet to the power transmitter 201. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 205 is present at the interface of the power transmitter 201.

Upon receiving the signal strength message, the power transmitter 201 moves into the Identification & Configuration phase. In this phase, the power receiver 205 keeps its output load disconnected and communicates to the power transmitter 201 using load modulation. The power transmitter 201 provides a power signal of constant amplitude, frequency and phase for this purpose (with the exception of the change caused by load-modulation). The messages are used by the power transmitter 201 to configure itself as requested by the power receiver 205. The messages from the power receiver 205 are not communicated continuously but are communicated in intervals.

Following the Identification and Configuration phase, the system moves on to the power transfer phase where the actual power transfer takes place. Specifically, after having communicated its power requirement, the power receiver 205 connects the output load and supplies it with the received power. The power receiver 205 monitors the output load and measures the control error between the actual value and the desired value of a certain operating point. It communicates such control errors to the power transmitter 201 at a minimum rate of e.g. every 250 ms to indicate these errors to the power transmitter 201 as well as the desire for a change, or no change, of the power signal. Thus, in the power transfer phase, the power receiver 205 also performs load modulation of the power signal in load modulation intervals in order to communicate information to the power transmitter 201. It will be appreciated that other communication approaches may alternatively or additionally be used.

Figure 3:
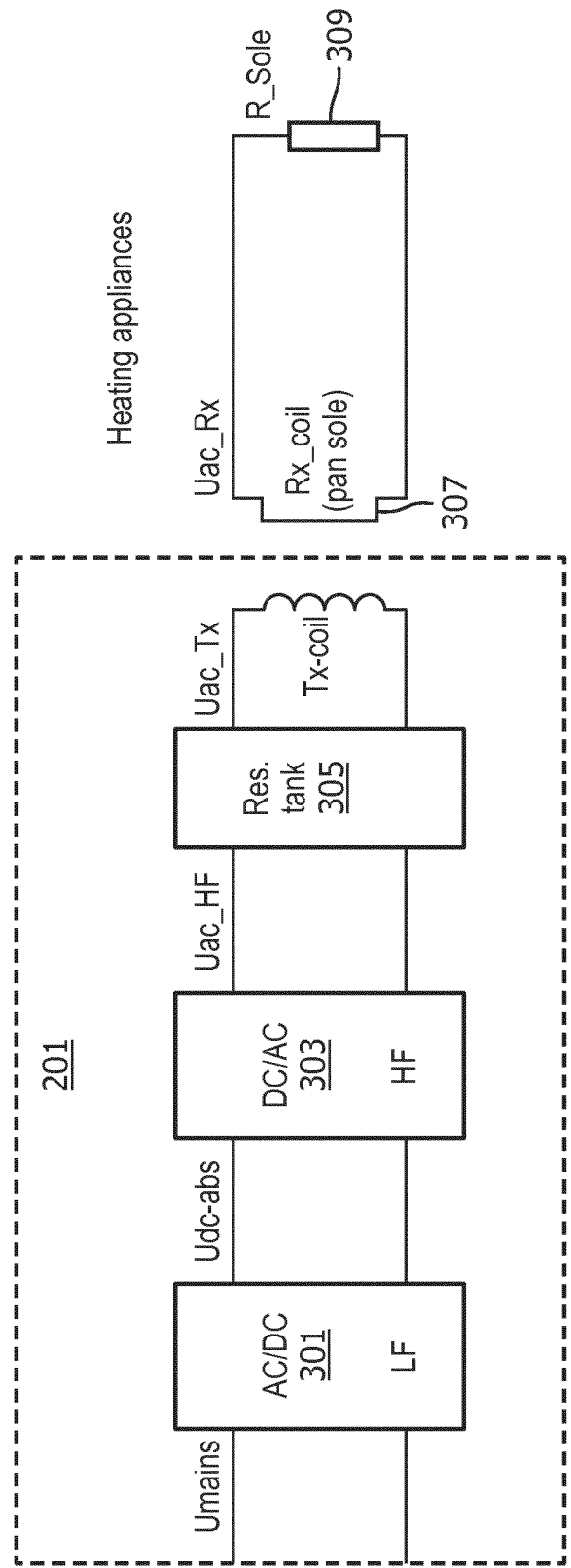
FIG. 3 is an illustration of a power path of a wireless power transfer system.

FIG. 3 illustrates an example of a power supply path for providing a power transfer to an electromagnetic load, such as specifically a heating element (e.g. a pan). The power provision comprises a power transmitter 201 is as described with reference to FIG. 2. The power transmitter 201 comprises a power source 301 in the form of an AC/DC converter which rectifies the input ac voltage (e.g. the mains). The rectified mains signal is fed to a DC/AC converter in the form of an inverter 303 which generates a high frequency drive signal that is fed to a resonant tank 305 (a tuned L-C circuit) including a transmitter coil. The system includes an electromagnetic load in the form of a heating pan. The electromagnetic load can be represented by a receiver coil 307 and a load R_Sole 309 (representing the loading of the electromagnetic load and specifically the Eddy current losses in heating element).

Figure 4:
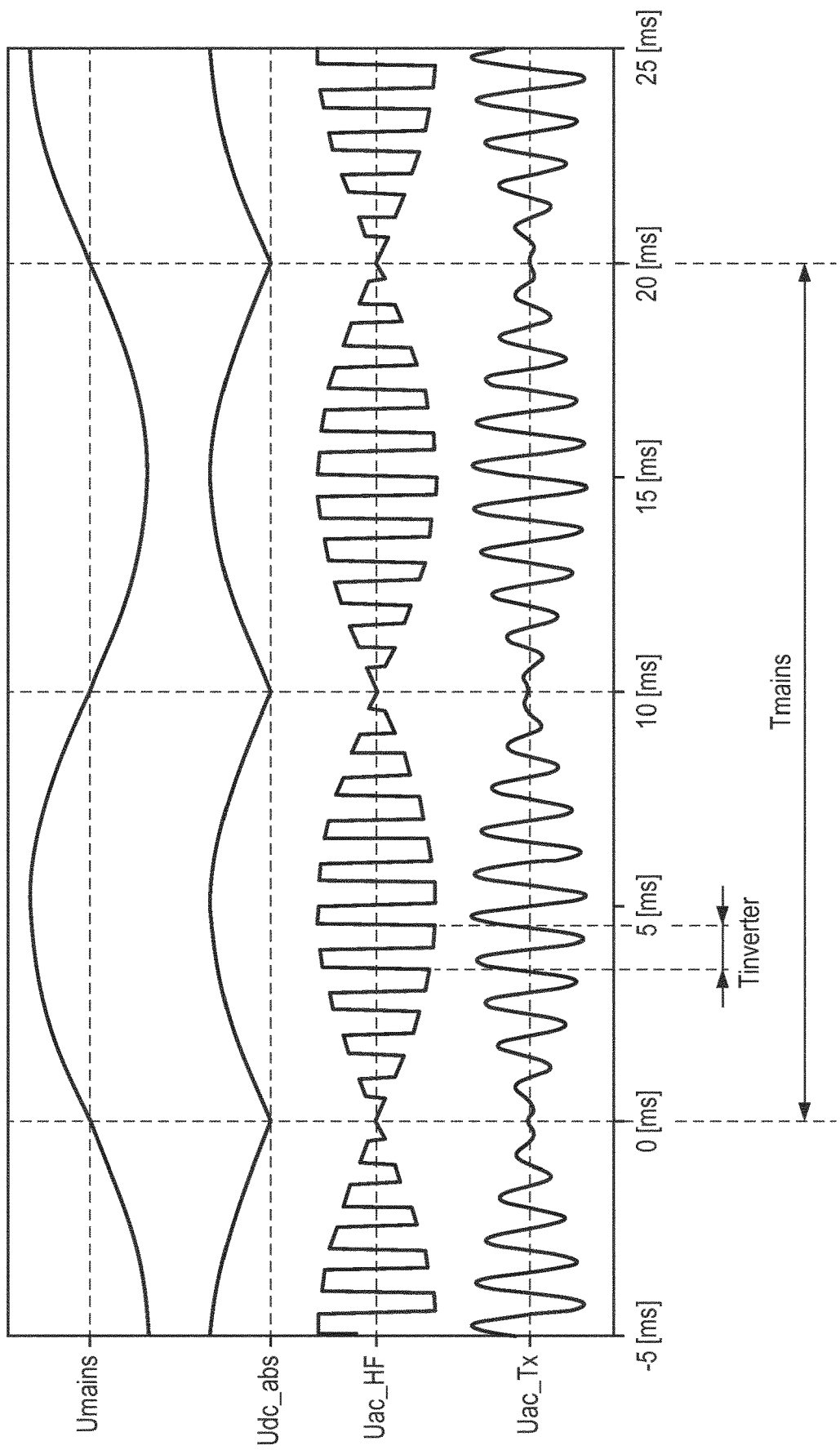
FIG. 4 is an illustration of some voltage waveforms of a power path of a wireless power transfer system.

FIG. 4 illustrates the voltage waveforms of the power path of FIG. 3. The mains voltage Umains is rectified by the AC/DC converter 303 to the voltage Udc_abs. A large storage capacitor, which is used to buffer the rectified mains voltage, is normally not applied in these kinds of applications since it will add to the total mains harmonic distortion of this application. As a result, a varying DC voltage is generated by the AC/DC converter 303.

Because of the characteristics of the rectified voltage Udc_abs, the output voltage Uac_HF of the inverter 303 is shaped as shown in FIG. 4. The normal operating frequency of the inverter is in the order of 20 kHz to 100 kHz.

The transmitter coil, together with the receiver coil 307 and resistance R_Sole receiver 309 is essentially the load of the inverter 303. However, due to the nature of this load (both inductive and resistive) a resonant circuit is typically used in between the inverter 303 and this load in order to cancel the inductive part of the load. Furthermore, the resonant network typically results in a reduction in the switching losses of the inverter 303.

In the example, the power transmitter 201 thus does not transfer power to a conventional power receiver for provision of electrical power to an external load but instead provides a power to an electromagnetic load which directly extracts energy from the electromagnetic field generated by the power transfer system. The electromagnetic load may specifically comprise or consist in a conductive element in which the electromagnetic signal generates Eddy currents which then generate heat.

Further, in many embodiments, the electromagnetic load device or entity may comprise no functionality for communicating with the power transmitter, and thus no functionality for controlling the power transfer operation. Indeed, the electromagnetic load may simply be a conductive element such as a heating plate with no associated electronics or functionality.

The same power transmitter 201 may accordingly be used in different scenarios. Specifically, it may be used with a conventional power receiver 205 is in the example of FIG. 2 or it may be used with a simple electromagnetic load which has limited or possibly no functionality for interfacing with the power transmitter 201.

In an exemplary scenario, the power transmitter 201 may be used in a kitchen environment to provide wireless power to various kitchen appliances including blenders, food processors, kettles, pots, pans etc. In the example, the power transmitter 201 may be part of a group of power transmitters that may simultaneously provide power to a plurality of appliances. Some of the power transmitters may be provided in a cooking zone that is made from heat resistant materials (such as a ceramic material). Others of the power transmitters may be provided in a preparation zone that is made from a material that is not heat resistant (such as e.g. a kitchen worktop made from wood). Thus, the user may be in a situation wherein he may have a number of power positions available of which some may be suitable for appliances that may get hot whereas other power positions may be unsuitable for these positions. However, it may at times be useful for the user if these positions could also be used for providing power to heating appliances that may become hot.

Figure 1:
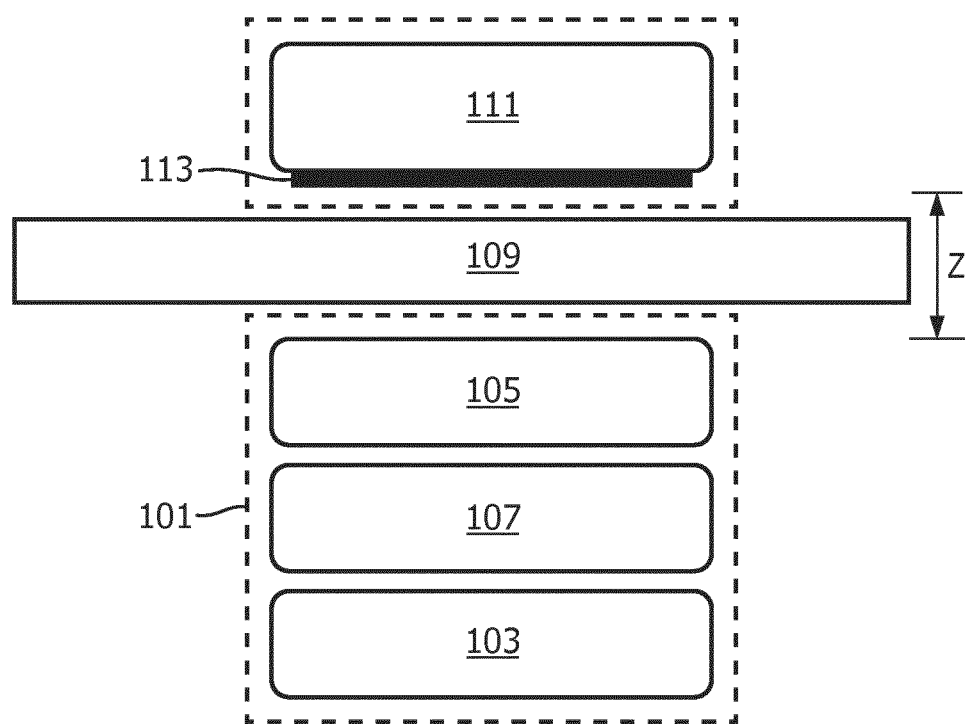
FIG. 1 is an illustration of a wireless power transfer system.

Specifically, the power transmitter 201 may be positioned immediately below (or be part of) a non-heat resistant worktop thereby rendering it unsuitable for heating appliances such as kettles, pots and pans. However, it may be desirable to use this power transmitter to power such heating appliances, and specifically heating appliances which may provide heat by the induction of Eddy currents in a conductive heat element. However, in order to maximize the power efficiency such heating elements may often be positioned at the part of the appliance which is in closest contact with the power transmitter. Specifically, for a power transmitter in a worktop surface, the appliance may be designed with the heating element at the bottom. In use, the heating element will accordingly also come into contact with the worktop surface (as illustrated in FIG. 1). This may cause damage to the worktop which typically will not be made heat resistant.

Figure 5:
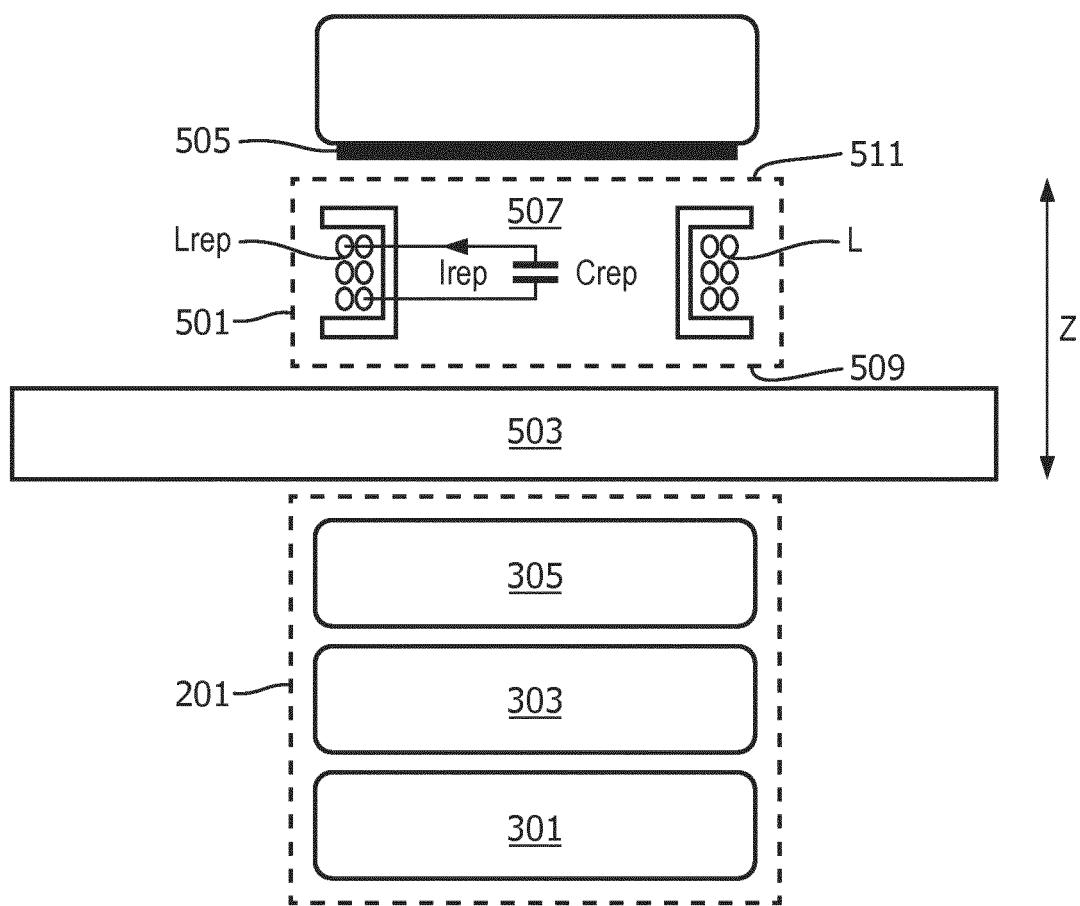
FIG. 5 is an illustration of a wireless power transfer system in accordance with some embodiments of the invention.

In order to address this issue, an intermediate device 501 which may form a thermal barrier may introduced between the worktop 503 and the heating plate/electromagnetic load 505 as illustrated in FIG. 5. The intermediate device 501 may be made from a suitable heat resistant material, such as from a suitable ceramic material. The intermediate device 501 may for example be implemented as a coaster or trivet that the user can put on the worktop, with the appliance (e.g. pot or pan) then being positioned on the coaster/trivet by the user.

However, although this may allow the non-protected power position (the power transmitter) to be used for powering heating devices, it will typically also substantially increase the distance Z between the power transmitter 201 and the electromagnetic load 201. Thus, the distance between the power transmitter coil and the heating plate will be substantially increased resulting in a substantially reduced coupling between these.

This will result in a requirement for higher currents in the power transmitter coil 305 in order to realize the same amount of magnetic flux field to be captured by the electromagnetic load 505. The higher currents cause more losses in the inverter 303 and transmitter coil 305. Also, the higher currents and the increased distance between power transmitter 201 and electromagnetic load 505 will result in more leakage flux. This leads to problems with Electromagnetic Interference (EMI) and Electromagnetic Force (EMF). For example, the International Electro technical Commission (IEC) sets international standards for radiated and conducted electromagnetic interference which must be taken into account for a wireless power transfer system, and these requirements may be increasingly difficult to meet when the distance between power receiver and power transmitter is increased.

In order to address such issues, an intermediate device 501 in accordance with some embodiments of the invention may comprise a resonance circuit including an inductor and a capacitor. The resonance circuit may effectively function as a power repeater directing the magnetic field towards the electromagnetic load. The resonance circuit may often be formed by a single inductor and a single capacitor. However, it will be appreciated that in some embodiments the resonance circuit may include a plurality of inductors and/or capacitors. Typically, such circuits are equivalent to a resonance circuit comprising a single capacitor and inductor. It will also be appreciated that the resonance circuit may include other components, such as e.g. resistors or sometimes switch elements.

Figure 6:
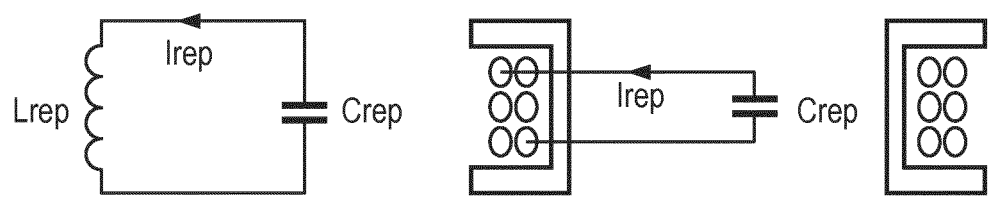
FIG. 6 is an illustration of an example of a power repeater for a wireless power transfer system in accordance with some embodiments of the invention.

Typically, the circuit may form a simple (equivalent) parallel resonant circuit such as is illustrated in FIG. 6 (shown both schematically and with a cross-sectional view of the inductor).

It will be appreciated that these issues are not specific to the intermediate device 501 forming a thermal barrier but will also be appropriate when the intermediate device 501 does not provide a thermal barrier. For example, the intermediate device 501 may be made from the same material as the worktop 503 (specifically wood) and only be used for low temperature heating applications (or for non-heating applications). Indeed, in some embodiments, it may even be acceptable for a intermediate device 501 to be used which will be damaged by the heating element. For example, it may be made from the same material as the worktop 503 but it may be acceptable for this to e.g. be marked due to excessive heating as it in contrast to the worktop 503 may be low cost and easily replaceable. Thus, the presence or function of a thermal barrier of the intermediate device 501 may be advantageous in many embodiments but is by no mean essential and may be avoided in many practical embodiments.

FIG. 5 illustrates the intermediate device 501 comprising a power repeater 507 comprising a resonance circuit, in this case formed by the inductor Lrep (shown in cross section) and the capacitor Crep.

The intermediate device 501 has a first surface area 509 which is in contact with the worktop 109 close to the power transmitter 101 when the system is in use. Thus, the intermediate device 501, and specifically the power repeater/resonance circuit 507 couples to the power transmitter 101 through the first surface area 509. The power transmitter 101 accordingly generates a first electromagnetic signal/field/flux to which the power repeater 507 couples predominantly via the first surface area 509.

Furthermore, the intermediate device 501 comprises a second surface area 511 which is intended to be in contact with the electromagnetic load 505 when in use. Specifically, the heating element of a heating device may be positioned on the second surface area 511.

The wireless power is provided to the electromagnetic load 505 through a second magnetic signal/field/flux which is predominantly provided through the second surface area 511. Thus, the coupling of the electromagnetic load 505 to the intermediate device 501/power repeater 507 is predominantly via the second surface area 511.

The second surface area 511 may specifically be arranged to couple to the electromagnetic load 505 by being arranged to receive the electromagnetic load. The second surface area 511 may be arranged to touch, attach, connect to, or rest on a surface of the electromagnetic load 505, or may provide a surface area for the electromagnetic load 505 to be positioned on.

The first surface area 509 may specifically be arranged to couple to the power transmitter 201 by being arranged to receive the power transmitter 201. The first surface area 509 may be arranged to touch, attach, connect to, or rest on a surface of the power transmitter 201, or may provide a surface area for the power transmitter 201 to be positioned on.

In the intermediate device 501, the resonance circuit includes an inductor and a capacitor where the inductor is arranged to couple to the power transmitter 201 through a first surface area 509 and to the electromagnetic load 505 through a second surface area 511. The resonance circuit has the effect of concentrating energy of the power transfer electromagnetic signal from the first surface area 509 towards the second surface area 511. Specifically, the resonance circuit has the effect of concentrating/increasing the electromagnetic flux density through the second surface area (compared to a situation where the resonance circuit were not present).

In the specific example, the majority of the magnetic flux reaching the power repeater/resonance circuit, and specifically the inductor Lrep, does so via the first surface area 509. This flux may be considered to correspond to a first magnetic signal. Similarly, the majority of the magnetic flux reaching the electromagnetic load 505 from the power repeater/resonance circuit, and specifically from the inductor L, does so via the second surface area 511. This flux may be considered to correspond to a second magnetic signal.

The depth of the thermal barrier is typically substantial, and indeed in many embodiments, the distance between the second surface area 511 and the first surface area 509 is at least 1 cm, 2 cm, 3 cm or even 5 cm. Such significant depths may provide a very efficient thermal insulation and protection. Indeed, it may typically allow very hot heating elements to be thermally isolated from thermally sensitive work surfaces. However, an associated disadvantage is that the direct coupling between the power transmitter 201 and the electromagnetic load 505 may be substantially reduced leading to increased power losses etc. In the described approach, these disadvantages are mitigated by the thermal barrier comprising the power repeater 507.

Specifically, the power repeater 507 is arranged to concentrate the energy of the second electromagnetic signal towards the second surface area 511. Specifically, the power repeater 507 may effectively act as a magnetic lens which concentrates the flux from the first electromagnetic signal to provide the second electromagnetic signal. The power repeater 507 achieves the concentration of the magnetic field by the resonance circuit oscillating with a current induced from the first electromagnetic signal. Effectively, the resonance circuit couples to the power transmitter 201 and to the electromagnetic load 505 thereby resulting in the magnetic flux from the power transmitter 201 being concentrated when provided to the electromagnetic load 505. The approach may allow the overall coupling between the power transmitter coil and the electromagnetic load 505 to be determined by the distances between the power transmitter coil and the power repeater 507 and between the power repeater 507 and the electromagnetic load 505 rather than by the total distance between the power transmitter coil and the electromagnetic load 505.

The resonance circuit may effectively bridge the distance between transmitter coil and the electromagnetic load (heating element) by resonating at or near the frequency of the power signal generated by the power transmitter. The resonance frequency frepeater of the resonance circuit can be determined by inductor Lrep and a capacitor Crep, using the following formula:

$$frepeater = \frac{1}{2*\pi*\sqrt{Lrep*Crep}}$$

The inductance value Lrep of the resonance circuit may be measured in air without the electromagnetic load or power transmitter 201 nearby. Typical values for Lrep and Crep may 200 uH and 200 nF respectively, which results in a resonance frequency frepeater of 25 KHz. However, it will be appreciated that the specific values will depend on the individual embodiments and the specific resonance frequency.

When the resonance frequency of the resonance circuit is tuned properly to the frequency of the power signal, a resonating current Irep is induced in the resonance circuit. Under this condition, the magnetic field lines inside the loop area are exactly in phase with the magnetic field lines generated by the power transmitter 201. As a consequence, the magnetic field lines of the first surface is guided towards the second surface, i.e. the magnetic field lines from the power transmitter 201 are guided towards the electromagnetic load 505.

In typical operation, the resonance frequency of the resonance circuit of the power repeater may shift e.g. due to the presence of the load, thermal variations etc. In some embodiments, the system, and in particular the power transmitter, may be arranged to dynamically adapt to such changes. For example, the operating/drive frequency may be adapted to match the shifted resonance frequency (e.g. based on finding an extremum for measurements of the effective impedance of the resonance circuit in the power transmitter).

Figure 7:
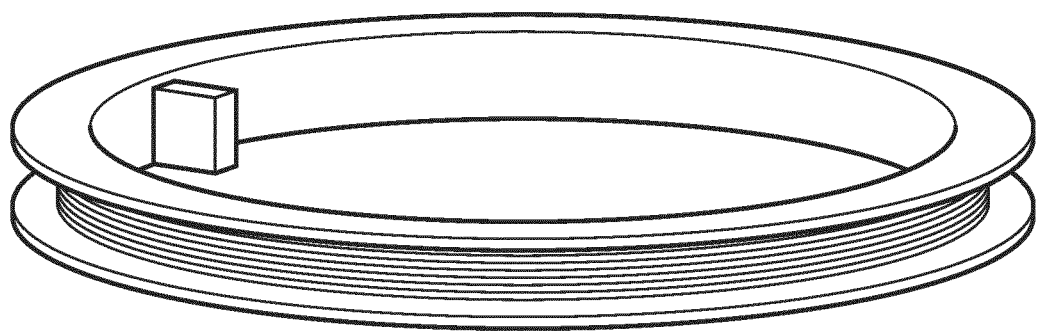
FIG. 7 is an illustration of an example of a power repeater for a wireless power transfer system in accordance with some embodiments of the invention.

FIG. 7 shows an image of a three-dimensional view of an implementation of the power receiver/resonance circuit 507. Typical diameters for the inductor may be in the 10 cm-25 cm range.

Thus, the described approach may provide a means for e.g. using a thermal barrier to provide thermal insulation and protection between a power transmitter 201 and an electromagnetic load 505 while reducing and mitigating the impact on the power transfer. Specifically, the increased distance between the power transmitter 201 and the electromagnetic load 505 needed to create the thermal barrier is bridged by a power repeater within the volume of the thermal barrier.

In the example, the second surface area 511 and the first surface area 509 are on opposite surfaces of the intermediate device 501, i.e. they are opposite each other. However, it will be appreciated that whereas this may be a practical implementation in many scenarios, the geometric interrelation between the surfaces may be different in other embodiments.

Similarly, the first surface area 509 is in the example arranged to allow the intermediate device 501 to contact and specifically rest on the power transmitter 201/worktop. Similarly, the second surface area 511 is arranged to receive an electromagnetic load 505 which specifically is a heating appliance. The second surface area 511 may specifically be arranged for the electromagnetic load 505 to rest on when being powered. Furthermore, in the example, the second surface area 511 and the first surface area 509 are both substantially horizontal when in use. However, it will be appreciated that in other embodiments, the surfaces may have other characteristics and couple to the power transmitter 201 and electromagnetic load 505 in other ways.

In the system, the intermediate device 501 is a separate entity from the power transmitter 201 and the electromagnetic load 505. This may for example allow the intermediate device 501 to be implemented as a thermal barrier in the form of a trivet which can be placed on power provision positions of a kitchen preparation zone when these are used with heating appliances.

The intermediate device 501 may in this way provide thermal insulation and in addition, bridge the distance between power transmitter 201 and electromagnetic load 505 by a resonance coil (power repeater) that bridges the power signal to the cooking equipment. However, in addition to the (optional) thermal protection of the intermediate device (for which it is not an essential feature to provide thermal protection) and the improved power transfer efficiency achieved by the power repeater, the intermediate device 501 may further provide functionality assisting the operation and control of the power transfer.

Figure 8:
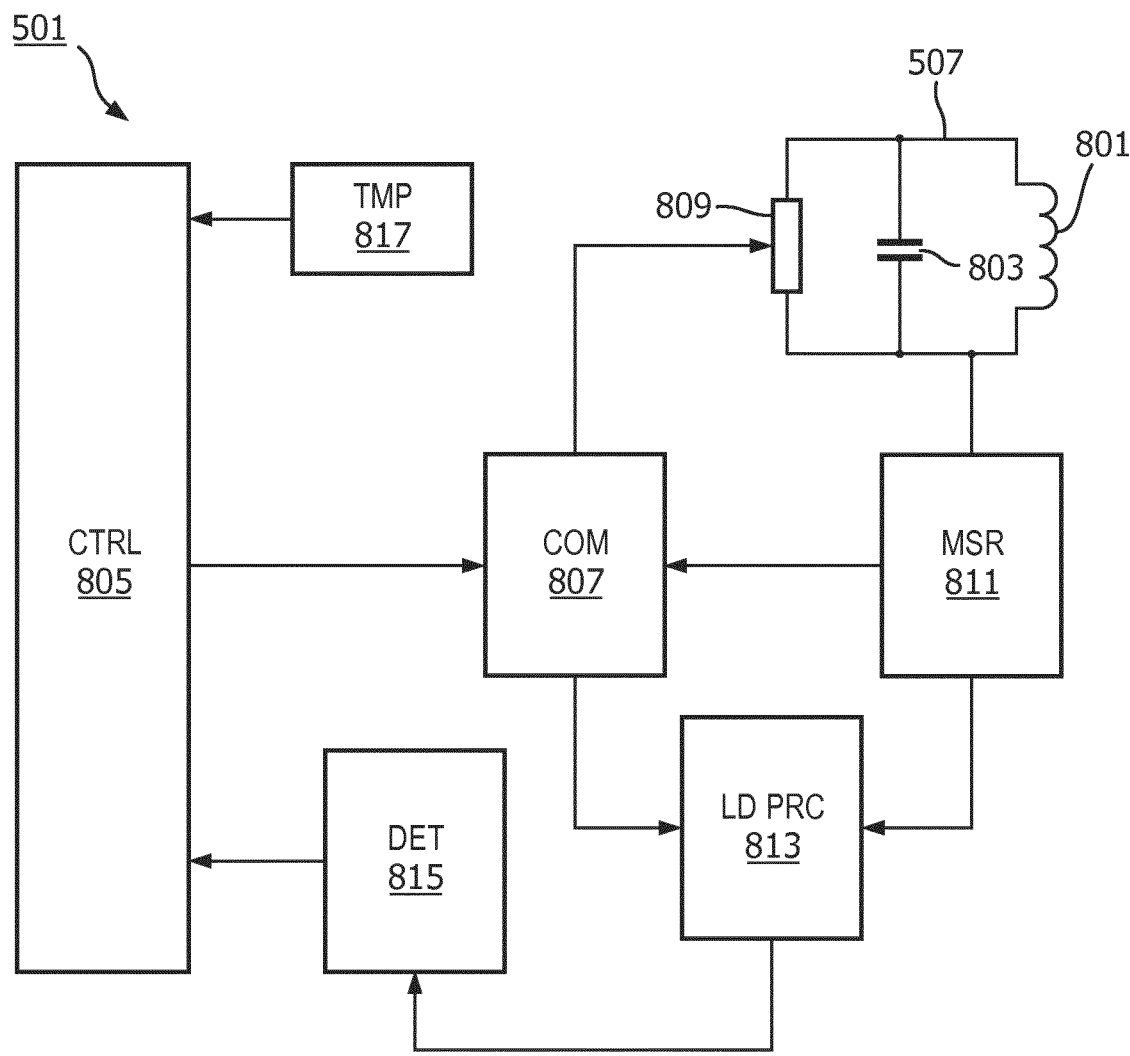
FIG. 8 is an illustration of an example of an intermediate device for a wireless power transfer system in accordance with some embodiments of the invention.

FIG. 8 illustrates examples of some elements of the intermediate device 501 in accordance with some embodiments of the invention. The intermediate device 501 comprises the resonance circuit 507 comprising an inductor 801 (Lrep) and capacitor 803 (Crep). As described, the resonance circuit 507 is arranged to concentrate the magnetic flux density through the second surface area 511, i.e. to concentrate the electromagnetic signal from the power transmitter 201 towards the electromagnetic load 505.

The intermediate device 501 further comprises a controller 805 which may be arranged to adapt the power control operation of the power transmitter 201 by exchanging one or more messages with the power transmitter 201.

The controller 805 is coupled to a communicator 807 which is arranged to exchange messages with the power transmitter 201. In the present example, the communicator 807 is arranged to transmit messages to the power transmitter 201 by load modulation of the power transfer electromagnetic signal generated by the power transmitter 201. Accordingly, the communicator 807 comprises a variable impedance 809 which loads the resonance circuit and in the specific example is coupled in parallel to the resonating components of the parallel resonance circuit. The variable impedance 809 is controlled by the communicator 807 which by changing the impedance can generate load modulation variations that can be detected by the power transmitter 201 as will be known to the skilled person.

In the example, the communicator 807 may also be arranged to receive messages from the power transmitter 201. In the example, the power transmitter 201 may communicate by modulating the power transfer electromagnetic signal, e.g. by applying an amplitude or frequency modulation.

The intermediate device 501 comprises a signal measurer 811 which is arranged to measure a property of a signal of the resonance circuit. For example, the inductor current may be measured. The signal measurer 811 may for example measure the instantaneous current amplitude or frequency and feed these values to the communicator 807 which may then proceed to demodulate the signal to generate the received messages.

In the example, the power transfer controller 805 may thus be arranged to control elements of the power transfer operation by exchanging messages with the power transmitter 201. The aspects of the power transfer operation controlled and the messages employed to do so will vary between different embodiments.

In many embodiments, the intermediate device 501 may be arranged to initiate or support initiation of a power transfer by exchanging messages that the electromagnetic load 505 is not capable of exchanging. For example, the power transmitter 201 may be arranged to transmit Identity and Configuration setup messages to initialize a power transfer.

Alternatively or additionally, the intermediate device 501 may be arranged to support the power transfer during the power transfer phase by exchanging power transfer phase messages that the electromagnetic load 505 is not capable of exchanging. For example, the intermediate device 501 may be arranged to transmit power control loop error messages during the power transfer phase.

Indeed, in some embodiments, the intermediate device 501 may be arranged to perform all the power transfer control and support required by the power transmitter 201, and indeed the intermediate device 501 may be the only device with which the power transmitter 201 interacts. Thus, in some embodiments, the electromagnetic load 505 may simply be a heating element, such as a conductive element, with no other functionality and the intermediate device 501 may provide all the functionality required by the power transmitter 201 for a power transfer operation. Indeed, the intermediate device 501 may in some such examples be effectively considered to implement a full power receiver functionality but with the actual core power extraction not being by the intermediate device 501 but instead being directly in the electromagnetic load 505 by this being exposed to the power transfer electromagnetic load 505.

The following description will focus on examples where the electromagnetic load 505 comprises no functionality for supporting the power transfer operation and all control and interaction with the power transmitter 201 is provided by the intermediate device 501. However, it will be appreciated that in other embodiments, the electromagnetic load 505 may at least partially comprise functionality for supporting the power transfer, and may specifically comprise functionality for transmitting at least some messages.

In order for the intermediate device 501 to effectively support and control the operation, it is necessary for it to determine whether an electromagnetic load 505 is indeed present or not. For example, power transfer should only be performed if indeed a heating element (e.g. pan) is present. Therefore, the intermediate device 501 should itself comprise functionality that allows it to detect whether an electromagnetic load 505 is present or not.

However, at the same time it is desirable to keep complexity of the intermediate device 501 as low as possible and it is in particular desirable if the operation of the intermediate device 501 can be achieved without requiring this to be connected to an external power source or requiring it to have a local energy storage such as a battery.

The intermediate device 50 of FIG. 8 comprises functionality which allows it to detect the presence of the electromagnetic load 505 and further this may in many embodiments be achieved without the intermediate device 501 requiring any other power than that which is provided by the power transmitter 201.

In the intermediate device 501 of FIG. 8, the communicator 807 is arranged to transmit a request message to the power transmitter 201 where the request message comprises (or forms) a request for the power transmitter 201 to generate a measurement electromagnetic signal. Typically, this request message may be generated and transmitted to the power transmitter 201 at times where no power transfer operation to the electromagnetic load is ongoing, i.e. during an inactive/standby/sleep mode.

In response to receiving the request message, the power transmitter 201 proceeds to generate a measurement electromagnetic signal.

The intermediate device 501 further comprises a load indication processor 813 which is arranged to determine a load indication that is indicative of the loading of the measurement electromagnetic signal.

In some embodiments, the measurement electromagnetic signal may be generated to have the same properties (i.e. frequency/origin) etc as the power transfer electromagnetic signal, i.e. the measurement electromagnetic signal may effectively be a power transfer signal with a suitable amplitude. In such cases, the load indication may be generated in response to a property of an electrical signal. For example, the load indication may be generated based on measurements (e.g. by the signal measurer 811) of e.g. the current of the inductor 801.

For example, for a measurement electromagnetic signal operating near resonance, it may typically be the case that the lower the current, the higher the loading of (i.e. the higher the power extraction from) the measurement electromagnetic signal.

If no load is present (i.e. no power extraction), the resonance circuit will not be damped by the load, which will lead to a higher current in the inductor of the resonance circuit of the power repeater. If a load is present (i.e. power extraction), the resonance circuit will be damped, which will lead to a lower current in the inductor.

Another option is to tune the frequency of the measurement signal such that the current in the repeater inductor becomes maximum while no load is present. When a load is then introduced, this may detune the circuit resonance resulting in the current in the inductor of the resonance circuit of the power repeater being reduced.

Thus, in some cases, a reduced inductor current is indicative of an electromagnetic load being present.

In some embodiments, the above described damping factor and the above described detuning factor may be combined to detect a reduction of the current in the inductor of the power repeater when a load enters the electromagnetic field. Thus, such a current may be used as a load indication with a reduction in the load indication indicating the presence of an electromagnetic load.

In this case, the load indication may thus be determined from measurements by the intermediate device 501 itself.

In other embodiments, the load indication may for example be generated in response to a message received from the power transmitter 201. For example, the power transmitter 201 may measure parameters indicative of the loading of the transmitter resonance circuit, such as e.g. the transmitter coil current, and may transmit this to the intermediate device 501. The communicator 807 may then forward this information to the load indication processor 813 which proceeds to use these values to determine the load indication. In other embodiments, the power transmitter 201 may calculate a load value and transmit this to the intermediate device 501 which may derive the load indication, e.g. by directly using the received value.

The load indication processor 813 is coupled to a detector 815 which is arranged to detect a presence of the electromagnetic load 505 in response to the load indication. For example, if the load indication indicates that the loading of the measurement electromagnetic signal is above a given threshold then the electromagnetic load 505 is considered present and otherwise it is considered not to be present.

The detector 815 is coupled to the controller 805 which can adapt its operation in response to the detection result. Specifically, a property of the message exchange may be modified or adapted depending on whether the presence of an electromagnetic load is detected or not. For example, if the detector 815 detects that an electromagnetic load 505 is present, the power transfer controller 805 may proceed to initiate a new power transfer operation in order to provide power to the electromagnetic load 505. For example, the power transfer controller 805 may control the communicator 807 to transmit a power transfer request message to the power transmitter 201.

Figure 9:
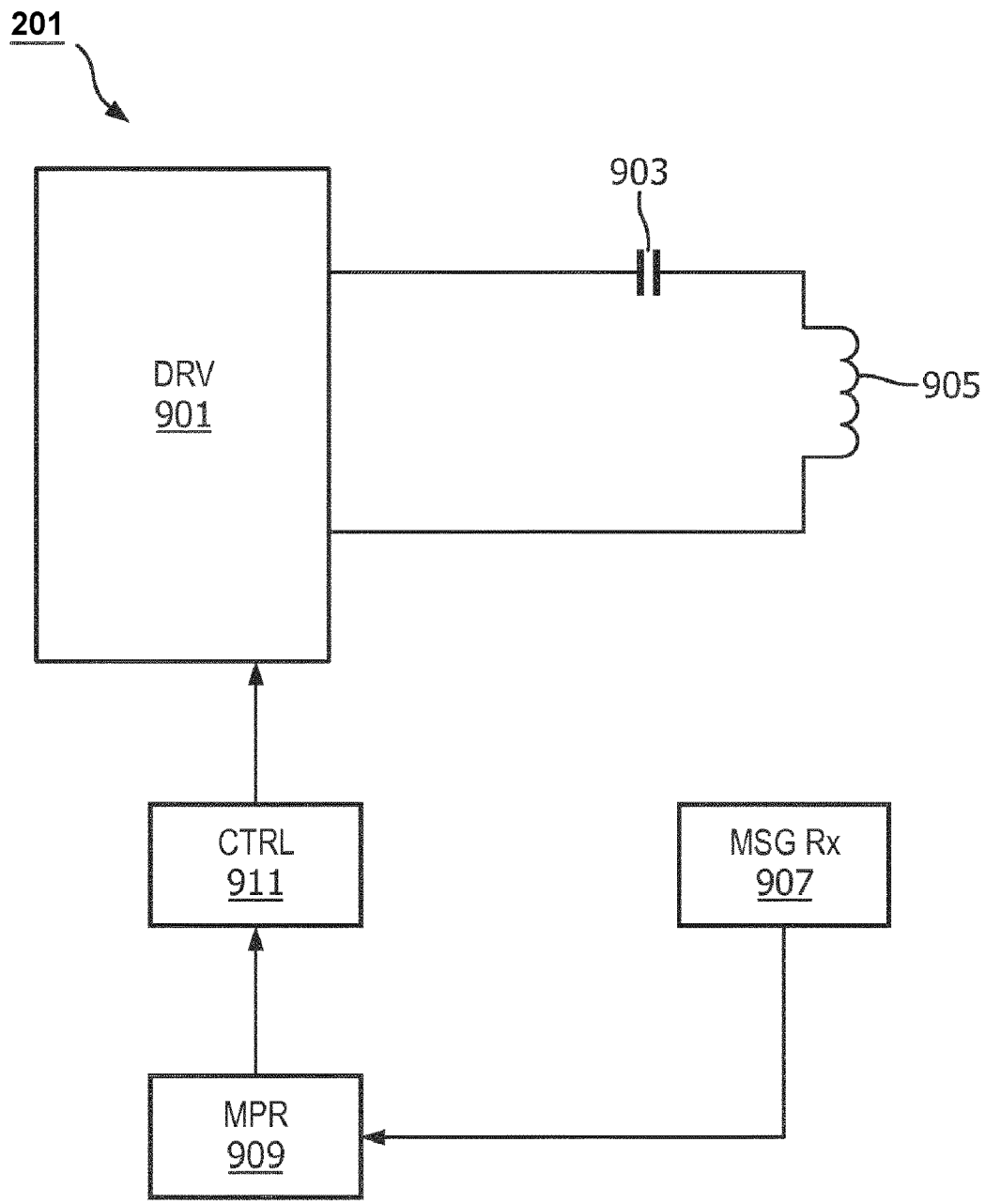
FIG. 9 is an illustration of an example of a power transmitter for a wireless power transfer system in accordance with some embodiments of the invention.

FIG. 9 illustrates an example of some elements of a power transmitter 201 in accordance with some embodiments of the invention.

The power transmitter 201 comprises a resonance circuit comprising a capacitive impedance 903 and an inductive impedance comprising a transmitter coil 905 for generating a power transfer electromagnetic signal for wirelessly transferring power to the electromagnetic load 505. Thus, the driver 901 generates a drive signal for the resonance circuit including the transmitter coil 905 in the same way as previously described (e.g. with reference to FIGS. 2-5).

In addition, the power transmitter 201 comprises a message communicator or transceiver 907 which is arranged to communicate messages with the intermediate device 501. The message transceiver 907 may specifically be arranged to transmit messages to the intermediate device 501 by modulating the drive signal using e.g. amplitude or frequency modulation (by controlling the inverter operation) and may be able to receive messages from the intermediate device 501 by detecting load modulation of the power transfer signal. For example, the message transceiver 907 may detect variations in the current through the transmitter coil 905 and detect the load modulation in response to this.

The message transceiver 907 is coupled to a message processor 909 which is arranged to determine and process the received messages. In particular, the message processor 909 is arranged to detect when a request message is received requesting the power transmitter 201 to generate a measurement electromagnetic signal. Specifically, the message processor 909 may evaluate the data of the received messages to see if it corresponds to the data for such a request message.

The power transmitter 201 further comprises electromagnetic signal generator 901, 911 which is coupled to the message processor 909 and which is arranged to generate the measurement electromagnetic signal in response to the detection of the request message.

Thus, when the message processor 909 detects that the measurement request message has been received, it informs the electromagnetic signal generator 901, 911 which then proceeds to generate the measurement electromagnetic signal. In the present case, the electromagnetic signal generator 901, 911 is formed by a signal generator controller 911 and the inverter 901 with the signal generator controller 911 controlling the inverter 901 to generate a drive signal which is applied to the resonance circuit to generate the measurement electromagnetic signal.

Thus, in the described system, the intermediate device 501 is arranged to detect whether an electromagnetic load 505 is present or not and it may adapt its power control operation accordingly. The adaptation of the power control operation is achieved by the message exchange being dependent on whether the presence of an electromagnetic load is detected or not. However, the detection is not based on a signal generated by the intermediate device 501 but rather is based on a signal generated by the power transmitter 201 under the control of the intermediate device 501. This approach may provide an efficient approach with an advantageous distribution of functionality and specifically may allow an intermediate device 501 to control a power transfer operation without e.g. requiring the intermediate device 501 to be separately powered.

In the specific example, the measurement electromagnetic signal is generated to correspond to a power transfer electromagnetic signal. Specifically, it is generated using the transmitter coil 905 which is also used to generate the power transfer electromagnetic signal (for brevity referred to as a power transfer signal). Further, it may be generated to belong to the same frequency band/interval/range as the power transfer signal. Specifically, the power transfer signal may be in the range from typically 50 kHz-200 kHz and the measurement electromagnetic signal may also be generated to be in this range. Indeed, in many embodiments, the measurement electromagnetic signal may be generated to be indistinguishable from a power transfer signal (albeit possibly with a lower power level).

The use of a measurement electromagnetic signal which corresponds to a power transfer signal may provide various advantages in many embodiments including for example allowing reuse of circuitry also used for the power transfer. The approach may thus allow a low complexity approach in many embodiments It will be appreciated that different approaches and parameters for determining the load indication may be used in different embodiments. In many embodiments, the load indication may be determined to be indicative of an impedance of at least one of the resonance circuit of the power transmitter 201 and the resonance circuit of the intermediate device 501. The impedance of these resonance circuits will change when the loading of the electromagnetic field generated by the power transmitter 201 changes. In particular, the impedance of the resonance circuits will change depending on whether the electromagnetic load 505 is present or not.

In some embodiments, the intermediate device 501 may be arranged to generate the load indication based on locally determined properties relating to the measurement electromagnetic signal. Specifically, the load indication processor 813 may be arranged to determine the load indication in response to a measurement of a property of the power transfer electromagnetic signal, and specifically the load indication processor 813 may determine the load indication in response to a measurement of a signal of the resonance circuit of the intermediate device 501 (the signal being dependent on the loading of the measurement electromagnetic signal).

In particular, the load indication processor 813 may sense the current through the inductor 801 and/or a voltage over the inductor 801/the capacitor 803. Based on the measurements, a load indication may be calculated, i.e. as the effective impedance of the inductor 801 determined as phase between the voltage over this and the current through it. In some embodiments, the load indication may be determined directly as a measure of e.g. the current through or voltage over the inductor 801. The load indication may for example indicate a resistive element of the impedance of the inductor 801 with a higher resistive (ohmic) value reflecting a lower loading.

The detector 815 may proceed to determine whether the electromagnetic load 505 is present or not based on a comparison of the load indication to a reference value. For example, if the load indication indicates a loading of the measurement electromagnetic signal which is different than the reference value then this is indicative of the electromagnetic load 505 being present and if it is below the reference value then this may be considered to be indicative of the electromagnetic load 505 not being present. This, in some embodiments, the reference value may be a detection threshold.

It will be appreciated that the electromagnetic load being detected to be present may in some embodiments be a result of a detection threshold being exceeded and in other embodiments may be a result of the load indication falling below a detection threshold. For example, in many embodiments, the inductor current of the power repeater may be lower for the electromagnetic load being present than when it is not present. In such scenarios, the electromagnetic load may be detected to be present if a load indication reflecting the inductor current is below a threshold.

In some embodiments, the reference value may be a predetermined value, such as e.g. a value being determined during the design or manufacturing phase. Such a static approach may for example be suitable for applications wherein the scenario in which detections are being performed can to a sufficient degree be considered the same every time. For example, the power transmitter 201 may be arranged to generate a measurement electromagnetic signal with a predetermined power level, the intermediate device 501 may physically interface (e.g. lock) to both the power transmitter 201 (the transmitter coil 905) and the electromagnetic load 505 (e.g. a pan) such that the physical arrangement is always substantially the same, and the characteristics of the electromagnetic load 505 may be considered sufficiently static (e.g. the intermediate device 501 may always be used with the same type of pan). In such examples, the reference value may thus be a constant value that e.g. may be programmed into the detector 815.

However, in many embodiments, the reference value is dynamically determined based on previous measurements. Specifically, the detector 815 may be arranged to determine a reference value based on a previous measurement of a property of the measurement electromagnetic signal, such as specifically a measurement of an impedance or current of the inductor 801.

For example, the load indication processor 813 may periodically perform a detection and may thus periodically determine a load indication, such as a coil current for the inductor. The detector 815 may low pass filter the load indication values to determine an average load indication (over a suitable time interval) and it may use this low-pass filtered/averaged load indication value as the reference value for detections. Thus, if the inductor current is above average, the detector 815 considers it to be an indication of the electromagnetic load 505 being present and otherwise it considers it to be an indication of the electromagnetic load 505 not being present.

In some embodiments, the reference value may be determined selectively in response to measurements that are likely to reflect the situation when no electromagnetic load 505 is present. For example, the average value of the inductor current may be determined in response to only the inductor values for which the detector 815 indicates that the electromagnetic load 505 is not present. Thus, in some embodiments, the detector 815 may be arranged to detect if the electromagnetic load 505 is present in response to a comparison of the load indication and a previous load indication for which no electromagnetic load 505 was present.

In many embodiments, the electromagnetic signal generator 901, 911 is arranged to generate the measurement electromagnetic signal to have properties that correspond to a previously generated measurement electromagnetic signal. Specifically, the measurement electromagnetic signal may be generated to have substantially the same properties every time it is generated. In particular, the frequency and/or in particular the power level of the generated electromagnetic signal may be the same whenever the measurement electromagnetic signal is generated.

The properties may in some embodiments be predetermined or may e.g. be determined in response to specific requests by the intermediate device 501.

The use of the same properties may allow a more accurate detection and may in particular allow a comparison of current values to previous values to more accurately reflect changes in the external environment, and specifically whether the electromagnetic load 505 is present or not.

In some embodiments, the system may be arranged to establish a relation between the measurement electromagnetic signal and the (expected) measured signals. Specifically, a relation may be determined which reflects how the load indication is expected to vary as a function of properties of the measurement electromagnetic signal for at least one of the situation when an electromagnetic load is present and the situation when no electromagnetic load is present (typically it may reflect the expected relationship when no electromagnetic load is present as this is typically easier to predict).

If such a relation is established for a certain range of properties of the measurement electromagnetic signal, it may be less significant for the reference signal to have consistent properties as variations can be compensated for in the detection. For example, the presence of a load can be considered to be detected when the relation between the known properties of the measurement electromagnetic signal and the load indication determined based on measurements differs from the expected relation.

The reliable detection of whether the electromagnetic load 505 is present or not allows the intermediate device 501 to effectively control the power transfer operation. In particular, it may allow the intermediate device 501 to initiate a power transfer without risking this to be done without an electromagnetic load 505 being present.

In many embodiments, the power transfer controller 805 may be arranged to initialize a power transfer phase in response to the detection of the presence of an electromagnetic signal by exchanging power transfer control messages with the power transmitter 201. Specifically, the power transfer controller 805 may control the communicator 807 to transmit a power initialization request to the power transmitter 201. In many embodiments, the power transfer controller 805 may be arranged to proceed to support a full initialization of a power transfer by performing the interaction with the power transmitter 201 required for initializing a power transfer.

For example, for a Qi compatible system, the power transfer controller 805 may be arranged to support the Identification and Configuration by exchanging the required setup and configuration messages.

In some embodiments, the intermediate device 501 may include a power extractor (not shown) which is arranged to extract power from an electromagnetic signal generated by the power transmitter 201 to at least partially power up the intermediate device 501, and the communicator is arranged to transmit the request message to the power transmitter 201 as part of being powered up.

Thus, in such embodiments, the intermediate device 501 may e.g. wake up when the power transmitter 201 generates an electromagnetic signal and it may then proceed to generate a request for the power transmitter 201 to generate the measurement electromagnetic signal. E.g. for a Qi example, the power transmitter 201 may during a selection phase regularly generate an electromagnetic signal to detect if there are any objects present. This signal may be detected by the intermediate device 501 and used to generate a power supply signal allowing this to power the functionality required for requesting the generation of the measurement electromagnetic signal. In response, the power transmitter 201 generates the measurement electromagnetic signal and the intermediate device 501 can proceed to perform the detection process. For this operation, the power may be extracted from the measurement electromagnetic signal.

As a specific example, when the intermediate device 501 is placed on top of a Qi compatible power transmitter 201, this will detect the presence of an object by measuring an impedance change and accordingly it will wake-up from standby. The intermediate device 501 may use the power of an electromagnetic signal generated by the power transmitter 201 (e.g. the previous objection detection signal or a communication carrier provided for communication) to power up the necessary circuitry (including at least part of the power transfer controller 805). The power transfer controller 805 controls the communicator 807 to load modulate the electromagnetic signal in order to communicate initial messages to the power transmitter 201 thereby indicating to the power transmitter 201 that it is a valid power receiver. The power transfer controller 805 may request that the power transmitter 201 generates a measurement electromagnetic signal thereby allowing a detection of whether any electromagnetic load 505 is present (this may also provide power to the intermediate device 501).

If the power transfer controller 805 has no indication that an electromagnetic load 505 (e.g. a pan) is present on top of the intermediate device 501, it can indicate to the power transmitter 201 that it does not need any power by communicating a corresponding message and/or to stop communicating messages. On the reception of such an indication and/or after a certain time of not receiving any messages from the intermediate device 501, the power transmitter 201 may terminate the generation of the electromagnetic signal and may return to the standby mode where it will continue to monitor for any impedance change caused by objects.

However, the presence of the intermediate device 501 may possibly mean that the power transmitter 201 cannot reliably detect whether an electromagnetic load 505 is present or not. The presence of the intermediate device 501 may though result in the power transmitter 201 considering that an object is potentially present and it may accordingly proceed to initialize the process of determining whether such an object is indeed a power receiver.

In response to the object detection signal, the intermediate device 501 may wake up and may seek to determine whether an electromagnetic load 505 is present so that it should proceed to initialize a power transfer. However, the object detection signal may be insufficient for this and/or may not be present for long enough. Therefore, the intermediate device 501 may proceed to request the generation of the measurement electromagnetic signal on which basis the intermediate device 501 can determine whether an electromagnetic load 505 is present or not.

If an electromagnetic load is present, the intermediate device 501 proceeds to initialize a power transfer by exchanging the required messages with the power transmitter 201 thereby causing a power transfer to be initialized. However, if the detection operation indicates that no electromagnetic load 505 is present, the intermediate device 501 proceeds to terminate the power transfer operation. Thus, in this case, the initialization of the power transfer is terminated and the power transmitter 201, and indeed the intermediate device 501, may return to the standby or sleep phase (which specifically may correspond to the selection phase.

In some embodiments, such an object detection signal may not be suitable for powering of the intermediate device 501. For example, it may not be sufficiently strong to provide the required power. In some such scenarios (or indeed more broadly), the powering of the intermediate device 501 may not be based on an object detection signal (such as e.g. the one provided in the selection phase for a Qi system) but may e.g. be based on extracting power from a more powerful electromagnetic signal provided in response to a potential detection of an object by the power transmitter.

For example, the powering of the intermediate device 501 may be based on a ping power signal applied in the Identification and Configuration phase of Qi.

Even if an object detection electromagnetic signal generated by the power transmitter is not sufficiently strong to wake up and power the intermediate device 501, it may still be used by the power transmitter to evaluate the presence of a load in addition to the presence of the intermediate device. Indeed, in many embodiments, the power transmitter may detect a change in impedance and proceed to the next phase, i.e. the ping phase for Qi. However, this may often be a less accurate determination than using a dedicated measurement electromagnetic signal and may not allow easy interoperation with an intermediate device. Therefore, such an approach may be combined with the generation of a dedicated measurement electromagnetic signal on the request of the intermediate device 501.

As mentioned, the intermediate device 501 may terminate the power transfer operation in response to the detector 815 determining that the load indication is not indicative of the electromagnetic load 505 being present. This may specifically be as part of the power transfer initialization but could also be in response to a detection during a power transfer phase where power is actively provided to the electromagnetic load 505. For example, the power transfer may be terminated if the intermediate device 501 detects that the electromagnetic load 505 has been removed.

In some embodiments, the termination may be by the transmission of a specific power transfer termination request message to the power transmitter 201. The power transmitter 201 may receive this request and in response proceed to terminate the power transfer (initialization) and return to the standby state.

In other embodiments, the termination may be by the intermediate device 501 suppressing one or more power transfer control messages. For example, during the initialization, the intermediate device 501 may suppress (not transmit) one, more or typically all of the initialization or configuration messages that are required to initialize a power transfer. The intermediate device 501 may effectively simply act like a simple foreign object resulting in the power initialization being abandoned by the power transmitter 201.

During the power transfer phase, the intermediate device 501 may for example suppress transmission of power control loop error messages. In systems such as Qi, such messages are required with an interval of no more than 250 msec. If no power control loop error messages are received within a sufficiently long time interval, the power transmitter 201 will terminate the power transfer operation.

In many embodiments, the intermediate device 501 may be arranged to control the power level of the power transfer electromagnetic signal by transmitting power control messages to the power transmitter 201 during in particular the power transfer phase. Thus, the power control for the power transfer signal is achieved by the intermediate device 501 rather than by the electromagnetic load 505 which specifically may simply be a heating plate with no other functionality. Thus, in such embodiments, the power transfer may effectively be used with a simple conductive element, such as the heating element of conventional pan, with the intermediate device 501 effectively providing the power receiver control functionality.

The established power control loop is accordingly between the power transmitter 201 and the intermediate device 501 rather than between the power transmitter 201 and the electromagnetic load 505.

In some embodiments, the power control may e.g. be based on a measurement of the magnetic flux through the inductor/coil 801, i.e. in response to the current of the inductor 801. The power transfer controller 805 may e.g. monitor the current level and request an increase or decrease in the power level depending on whether the current through the inductor 801 is above or below a given reference value.

However, in many embodiments, the power control may be used to introduce a temperature control for the electromagnetic load 505. Specifically, the intermediate device 501 may comprise a temperature sensor 817 which is arranged to determine a temperature indication for the second surface, i.e. for the surface proximal to, or typically touching the electromagnetic load 505.

The temperature sensor may for example be positioned very close to, or in contact with, the second surface area 511. Thus, the temperature sensor may effectively measure the temperature of the second surface area 511, and thus indirectly the temperature of e.g. the heating element of the electromagnetic load 505.

The power transfer controller 805 may then generate power control loop error messages by comparing the measured temperature to a reference temperature. If the measured temperature is higher than the reference temperature then the power transfer controller 805 may generate and transmit a power down request message, and if the measured temperature is below the reference temperature then the power transfer controller 805 may generate and transmit a power up request message. In this way, the intermediate device 501 may be able to control the temperature of the electromagnetic load 505, and specifically of a conductive heating element of a conventional appliance, such as a pan.

Thus, in some embodiments, the intermediate device 501 may be arranged to control the energy level of the second electromagnetic signal. Specifically, it may control the electromagnetic flux/electromagnetic field strength at the electromagnetic load 505 based on temperature measurement information.

As a specific example, the power transfer controller 805 may be coupled to a temperature sensor 819 that measures the surface temperature where a pan is positioned and a temperature set-point may be used to determine the needed power level for heating the pan. Based on that information the power transfer controller 805 may provide control data to the power transmitter 201 according to the needed power level.

E.g. a low complexity temperature control may be based on the power transfer controller 805 determining:
a need for power when the measured temperature is lower than the temperature set-point; and
no need for power when the measured temperature is higher than the temperature set-point.

The temperature set-point (i.e. the referene temperature) can e.g. be provided by a manual user input.

In the previous examples, the load indication was generated by the intermediate device 501 based on measurements of parameters of the intermediate device 501. However, in some embodiments, the load indication may be determined in response to data received from the power transmitter 201.

Specifically, the power transmitter 201 may transmit a load message to the intermediate device 501 and this may comprise load data which reflects the loading of the measurement electromagnetic signal. The load data may for example reflect a value which is dependent on the loading of the measurement electromagnetic signal, such as a value of a parameter which reflects the impedance of the resonance circuit/transmitter coil 905. Specifically, the load data may include data for a measurement of the current and/or voltage over the transmitter coil 905 or capacitor 903, or may e.g. provide information on the input power of the signal driver (901)

The load indication processor 813 may extract these values and proceed to determine a suitable load indication. For example, it may calculate the impedance of the transmitter coil 905.

In other embodiments, the power transmitter 201 may itself calculate e.g. the impedance and transmit this information to the intermediate device 501. In some such cases, the intermediate device 501 may extract the information and use this directly as the load indication.

Such approaches may reduce the complexity of the intermediate device 501 and may in many scenarios provide a more accurate detection.

The previous examples focused on an example where the measurement electromagnetic signal was generated by driving the resonance circuit to generate a power transfer electromagnetic signal. Indeed, the generated measurement electromagnetic signal may have the same characteristics as a power transfer signal, including the same frequency etc.

However, in other embodiments, the measurement electromagnetic signal may be generated using another coil and with different characteristics than the power transfer signal.

Figure 10:
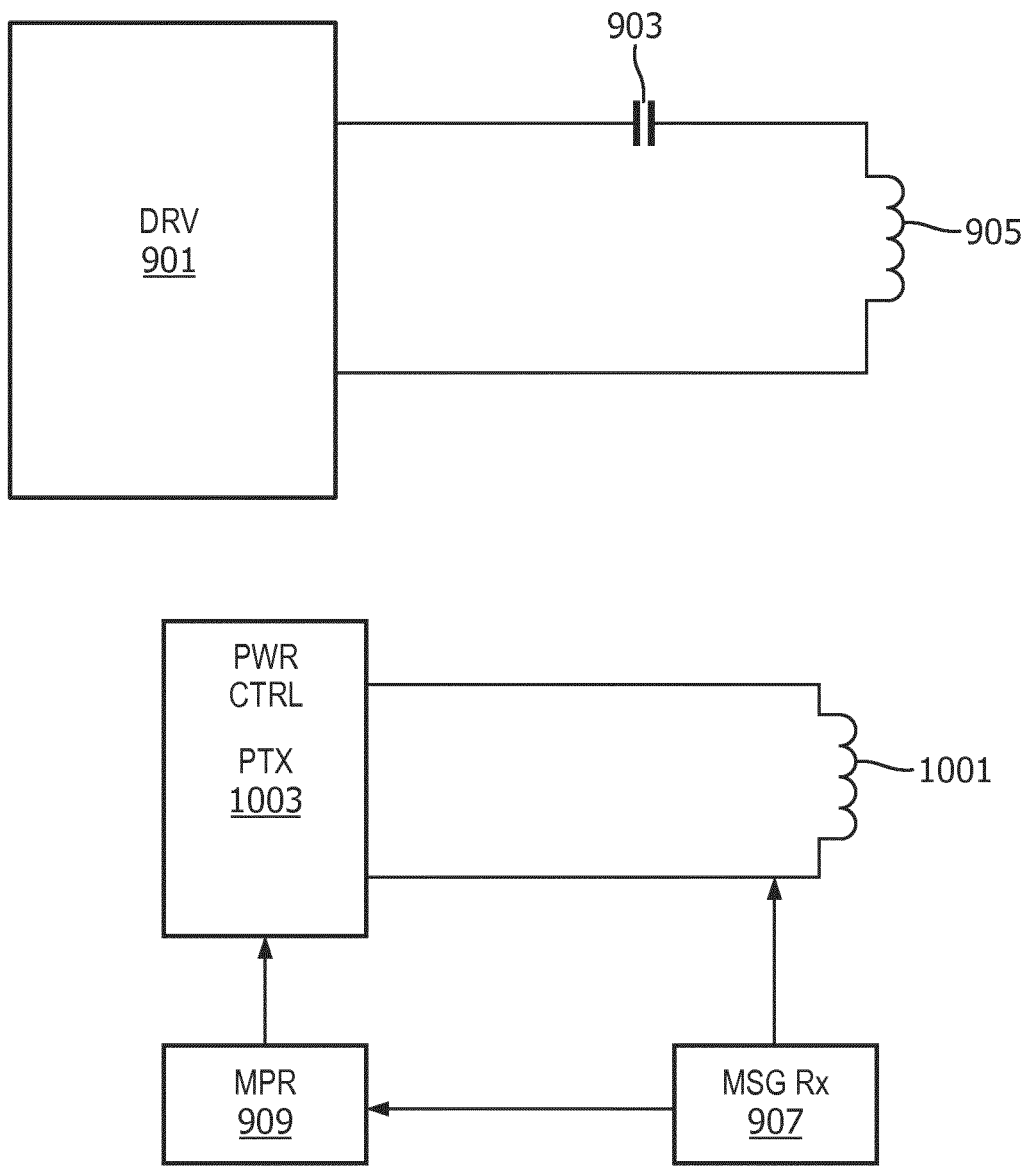
FIG. 10 is an illustration of an example of a power transmitter for a wireless power transfer system in accordance with some embodiments of the invention.

Indeed, in the example of FIG. 10, the power transmitter 201 of FIG. 8 has been modified to include a separate measurement coil 1001 which is arranged to generate the measurement electromagnetic signal. In the example, the measurement coil 1001 is coupled directly to an electromagnetic signal generator 1003 which is entirely separate from the driver 901 and which is directly arranged to generate the drive signal for the measurement coil 1001. The electromagnetic signal generator 1003 is coupled to the message processor 909 and when this detects the request for a measurement electromagnetic signal, the electromagnetic signal generator 1003 proceeds to generate a drive signal for the measurement coil 1001 thereby causing the measurement electromagnetic signal to be generated.

The use of a separate coil for generating the measurement electromagnetic signal may allow this to be individually optimized for the detection. In particular, the measurement electromagnetic signal may be generated to be in a different frequency band/range than the power transfer signal. In many embodiments, a minimum frequency of the measurement electromagnetic signal is at least twice the maximum frequency of power transfer signal. In some embodiments, the minimum frequency of the measurement electromagnetic signal is no less than 200 kHz, 500 kHz, 1 MHz, or 10 MHz. For example, a frequency of 13.56 MHz may be used thereby providing a very large separation between the measurement electromagnetic signal and the power transfer phase.

Figure 11:
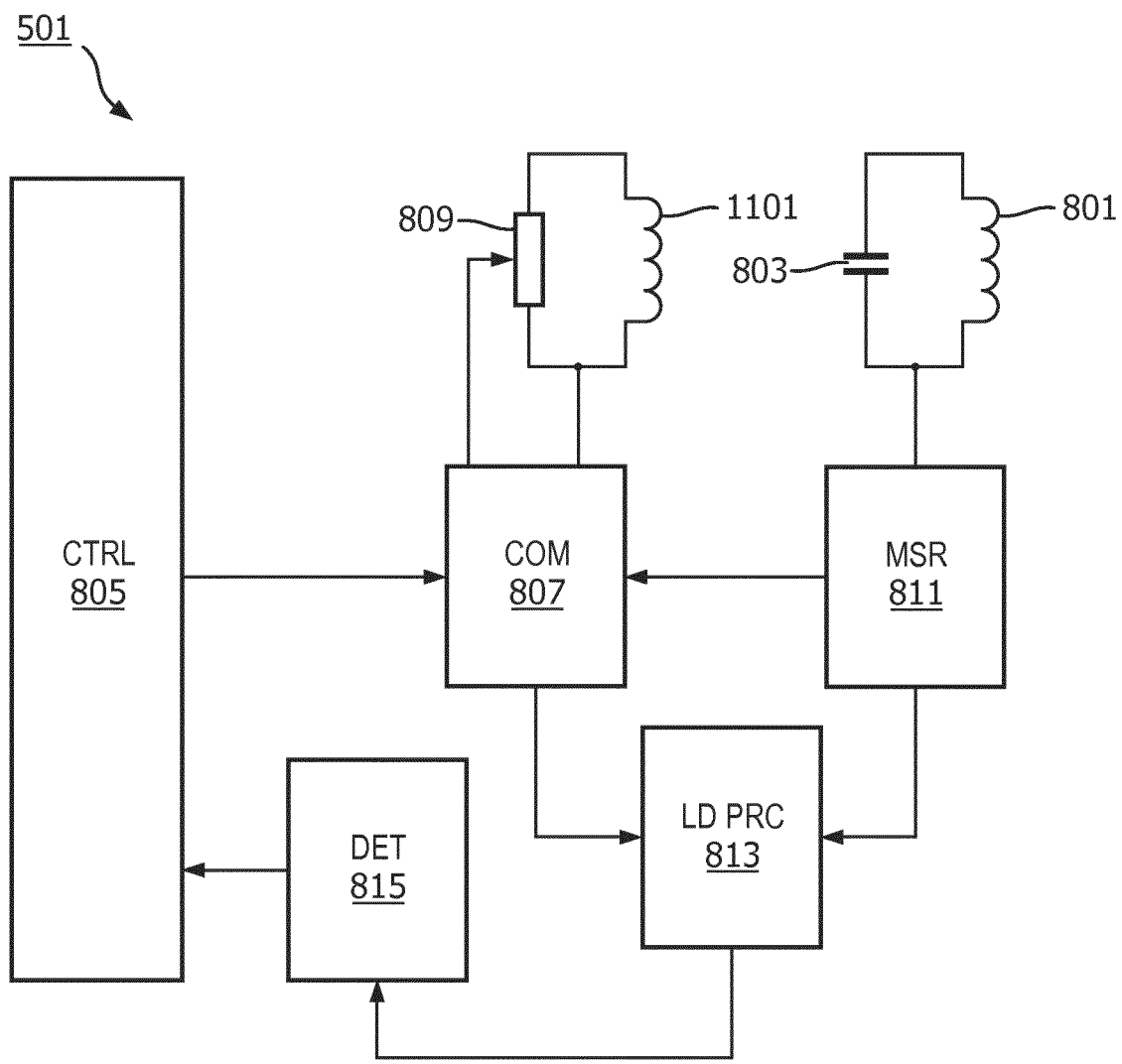
FIG. 11 is an illustration of an example of an intermediate device for a wireless power

In some embodiments, the measurement coil 1001 may specifically be a communication coil (also) used for communication between the power transmitter 201 and the intermediate device 501. In such embodiments, the intermediate device 501 may as illustrated in FIG. 11 in addition to the inductor 801 of the power repeater also comprise a communication coil 1101 for communication with the power transmitter 201.

In this example, the power transmitter 201 may generate a dedicated communication carrier using the measurement coil 1001 (which is thus also a communication coil). The measurement coil 1001 may couple to the communication coil 1101 and the communication may be e.g. by frequency or amplitude modulation of the carrier (for communication from the power transmitter 201 to the intermediate device 501) and load modulation (for communication from the intermediate device 501 to the power transmitter 201).

The frequency of the communication carrier is typically in a different frequency band than the power transfer signal. In many embodiments, a minimum frequency of the communication carrier is at least twice the maximum frequency of power transfer signal. In some embodiments, the minimum frequency of the communication carrier is no less than 200 kHz, 500 kHz, 1 MHz or 10 MHz. In some embodiments, a communication frequency of 13.56 MHz may be used thereby providing a very large separation of the power transfer and communication signals, and thus reducing cross-interference. In many embodiments using a separate communication coil for generation of the measurement electromagnetic signal, the measurement electromagnetic signal may essentially be generated to correspond to the properties of the communication signal.

In embodiments where a separate communication coil and carrier is used, the intermediate device 501 may in some embodiments be arranged to extract power from the communication signal, at least initially. For example, at some point during a standby phase, the power transmitter 201 may be arranged to generate a communication carrier. If an intermediate device 501 is present, this may in response generate a request for generation of a measurement electromagnetic signal. The power required for transmitting this request may be obtained by the intermediate device 501 extracting it from the communication carrier. In response to receiving the request, the power transmitter 201 may then generate a measurement electromagnetic signal—e.g. to correspond to a communication carrier or a power transfer signal. The intermediate device 501 may then proceed to detect if an electromagnetic load 505 is present or not. The intermediate device 501 may extract power from the measurement electromagnetic signal to do this.

In some embodiments, the intermediate device 501 may further comprise a user interface. The user interface may for example include a display which provides information to the user, such as the current mode of operation, whether an electromagnetic load is detected, the measured temperature of the electromagnetic load, a desired set-point temperature etc.

In addition, the user interface may include a user input and specifically may include a user input that can be used by a user to indicate whether the electromagnetic load 505 is present or not. The user may accordingly clearly define whether the electromagnetic load 505 is present or not, and this certainty may be used to calibrate the detection operation.

A calibrator may accordingly initialize a calibration of the detection operation in response to receiving information defining whether the electromagnetic load 505 is present or not. The calibration may for example calibrate a detection criterion. For example, if the detection is based on a comparison of the load indication to a reference value, this reference value may be calibrated (i.e. adapted) in response to the information. For example, if a load indication is determined for both a scenario wherein the user indicates that no electromagnetic load 505 is present and for a scenario wherein the user indicates that an electromagnetic load 505 is present, the reference value may be determined as midway between the two values.

In other embodiments, the calculation of the load indication may be calibrated/adapted based on the provided informatioen. For example, if the load indication is determined as the current of the inductor 801, this may be measured for a scenario where no electromagnetic load is present. The measured current may then be a reference current subtracted from the measured current in future measurements. The resulting offset or differential current may then provide a better estimate of the deviation from the scenario where no electromagnetic load is present.

The previous description has focused on embodiments wherein the electromagnetic load is a heating device, and specifically is a heating element in which eddy currents are directly induced by the power transfer signal. In many such embodiments, it may be desirable for the intermediate device 501 to include a thermal barrier which can provide protection against potentially high temperatures of the heating element. However, it will be appreciated that such a thermal barrier will not be necessary in e.g. embodiments wherein the heating element may only reach relatively low temperatures.

For example, the intermediate device 501 may in some embodiments be arranged to allow for a heating of chemical baths in a laboratory environment wherein the temperature increase is restricted to relatively low temperatures. For example, the intermediate device 501 may include a temperature sensor that will be in contact with the heating element during operation (or e.g. can be inserted into the chemical bath). It may further include functionality for restricting the power provided to the heating element (e.g. by transmitting power control messages) so that the measured temperature does not exceed, say, 40°. In such embodiments, the intermediate device 501 will typically not require, or indeed benefit, from a thermal barrier. Rather, the intermediate device 501 may be physically formed by/comprised in a suitable common day material, such as e.g. wood, plastic etc.

Further, it will be appreciated that whereas the described approach is particularly suitable and beneficial for heating applications, and specifically where the heating is done by the power transfer signal directly inducing eddy currents in a metal element, the approach is not limited to such applications. Indeed, the approach may also be used for non-heating applications where power is wirelessly transferred.

For example, rather than being a simple metal element, the electromagnetic load may be formed by a power receiving coil connected to e.g. an electrical motor. For example, a blender may include a power receiving coil with the current induced therein directly driving the electrical motor. The blender may for example not include specific control functionality for interfacing with the power transmitter. However, this functionality may be provided by the introduction of an intermediate device 501 as previously described for the example of a heating element. As an example, the intermediate device 501 may receive a simple electrical signal indicating the rotational speed of the motor and may in response generate power control messages that control the power transfer signal. Thus, in this way, the intermediate device 501 may control the operation of the blender. It will be appreciated that the described approach for detecting the presence of the blender (by the intermediate device 501) as described for the heating element can be applied mutatis mutandis to such an embodiment. The previous description has focused on specific examples of how the operation of the system may be adapted based on whether an electromagnetic load is detected or not. Specifically, the system may initiate or indeed terminate a power transfer operation based on the detection results. However, it will be appreciated that many other uses of the described approach for detecting whether an electromagnetic load is present can be envisaged. For example, in other embodiments, the system may be arranged to generate a user output, communicate an alert to other devices (e.g send a notification to a mobile phone), initiate a predetermined process, switch off another device or power transfer operation etc. Indeed, it will be appreciated that the detection of whether an electromagnetic load is present or not may be used in any suitable way without detracting from the invention.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method for a device that provides a power transfer to an electromagnetic load from a power transmitter by inductive coupling to the power transmitter and the electromagnetic load, the method comprising:
    transmitting a request message from the device to the power transmitter,
        wherein the request message comprises a request for the power transmitter to generate a measurement electromagnetic signal;
    determining a load indication that is indicative of a loading of the measurement electromagnetic signal by the electromagnetic load;
    detecting a presence of the electromagnetic load in response to the load indication; and
    transmitting subsequent messages from the device to the power transmitter to adapt an operation of the wireless power transfer system in response to the detection of the presence of the electromagnetic load.

2. A device that provides a power transfer to an electromagnetic load from a power transmitter; the device comprising:
    a first surface area and a second surface area;
    a resonance circuit
        wherein the resonance circuit comprises an inductor and a capacitor,
        wherein the inductor couples to a power transfer coil of the power transmitter through the first surface area
        wherein the inductor couples to the electromagnetic load through the second surface area;
    a communicator,
        wherein the communicator transmits a request message to the power transmitter,
        wherein the request message comprises a request for the power transmitter to generate a measurement electromagnetic signal in the power transfer coil;
    a load indication processor that determines a load indication,
        wherein the load indication is indicative of an electromagnetic loading of the measurement electromagnetic signal by the electromagnetic load;
    a detector that detects a presence of the electromagnetic load in response to the load indication; and
    a controller that adapts an operation of the power transfer from the power transmitter in response to the detection of the presence of the electromagnetic load.

3. The device of claim 2,
    wherein the controller controls the power transfer from the power transmitter by exchanging power transfer control messages with the power transmitter,
    wherein a property of the power transfer control messages is dependent on the detection of the presence of the electromagnetic load.

4. The device of claim 2, wherein the controller controls a power level of a power transfer electromagnetic signal from the power transfer coil by transmitting power control messages to the power transmitter.

5. The device of claim 4, comprising a temperature sensor, wherein the temperature sensor determines a temperature indication for the second surface, and
wherein the power transfer controller is arranged to generate the power control messages in response to the temperature indication.

6. The device of claim 2, wherein the controller initiates a power transfer phase in response to the detection of the presence of an electromagnetic signal by exchanging power transfer control messages with the power transmitter.

7. The device of claim 2, wherein the controller terminates a power transfer operation in response to the detector determining that the load indication is not indicative of the electromagnetic load being present.

8. The device of claim 2, comprising a power extractor,
wherein the power extractor extracts power from an electromagnetic signal generated by the power transmitter to at least partially power up the device; and
wherein the communicator is arranged to transmit the request message to the power transmitter as part of being powered up.

9. The device of claim 2, wherein the communicator receives a load message from the power transmitter,
wherein the load message comprises load data that is indicative of the loading of the measurement electromagnetic signal as determined by the power transmitter; and
wherein the load indication processor determines the load indication in response to the load data.

10. The device of claim 2, wherein the detector detects if the electromagnetic load is present in response to a comparison of the load indication and a previous load indication.

11. A wireless power transfer system comprising:
an intermediate device, and
a power transmitter that provides wireless power to an electromagnetic load via the intermediate device;
wherein the power transmitter comprises:
a resonance circuit comprising a capacitive impedance and an inductive impedance,
wherein the inductive impedance comprises a transmitter coil that generates a power transfer electromagnetic signal for wirelessly transferring the power to the electromagnetic load;
a driver that generates a drive signal for the resonance circuit;
a message communicator that communicates with the intermediate device;
a message processor that detects a request message received from the intermediate device,
wherein the request message comprises a request for the power transmitter to generate a measurement electromagnetic signal; and
an electromagnetic signal generator that generates the measurement electromagnetic signal in response to the detection of the request message; and
wherein the intermediate device comprises:
a first surface area and a second surface area;
a resonance circuit
wherein the resonance circuit comprises an inductor and a capacitor,
wherein the inductor couples to a power transfer coil of the power transmitter through the first surface area
wherein the inductor couples to the electromagnetic load through the second surface area;
a communicator,
wherein the communicator transmits the request message to the power transmitter,
wherein the request message comprises the request for the power transmitter to generate the measurement electromagnetic signal in the power transfer coil;
a load indication processor that determines a load indication,
wherein the load indication is indicative of an electromagnetic loading of the measurement electromagnetic signal by the electromagnetic load;
a detector that detects a presence of the electromagnetic load in response to the load indication; and
a controller that adapts an operation of the wireless power transfer system in response to the detection of the presence of the electromagnetic load.

\* \* \* \* \*